(12) United States Patent  (10) Patent No.: US 6,727,965 B1
Kubota  (45) Date of Patent: Apr. 27, 2004

(54) SEMITRANSPARENT LIQUID CRYSTAL DISPLAY DEVICE

(75) Inventor: Hirofumi Kubota, Nishinomiya (JP)

(73) Assignee: Matsushita Electric Industrial Co., Ltd. (JP)

( * ) Notice: Subject to any disclaimer, the term of this patent is extended or adjusted under 35 U.S.C. 154(b) by 31 days.

(21) Appl. No.: 09/786,647

(22) PCT Filed: Jul. 7, 2000

(86) PCT No.: PCT/JP00/04578

§ 371 (c)(1),
(2), (4) Date: Mar. 7, 2001

(87) PCT Pub. No.: WO01/04695

PCT Pub. Date: Jan. 18, 2001

(30) Foreign Application Priority Data

Jul. 7, 1999 (JP) .......................................... 11/192763

(51) Int. Cl.[7] ........................ G02F 1/1335; G02F 1/136
(52) U.S. Cl. ........................ 349/113; 349/106; 349/38
(58) Field of Search ........................ 349/113, 57, 106, 349/38, 95

(56) References Cited

U.S. PATENT DOCUMENTS

| 5,724,112 A | * | 3/1998 | Yoshida et al. | ............. 349/117 |
| 6,028,650 A | * | 2/2000 | Kuroha et al. | ................. 349/38 |
| 6,195,140 B1 | * | 2/2001 | Kubo et al. | ..................... 349/38 |
| 6,292,240 B1 | * | 9/2001 | Kamiya et al. | ................ 349/84 |
| 6,366,333 B1 | * | 4/2002 | Yamamoto et al. | ......... 349/113 |
| 6,380,995 B1 | * | 4/2002 | Kim | ........................... 349/113 |

FOREIGN PATENT DOCUMENTS

| JP | 07-318929 | 5/1994 |
| JP | 10-325953 | 4/1997 |
| JP | 10-319422 | 6/1998 |

* cited by examiner

Primary Examiner—Toan Ton
Assistant Examiner—Thoi V. Duong
(74) Attorney, Agent, or Firm—Parkhurst & Wendel, L.L.P.

(57) ABSTRACT

In a semitransparent liquid crystal display device comprising semitransparent layers having a projections and depressions structure including reflective portions and transparent portions, the transparent portions are formed so as to include nearly flat regions of the projections and depressions structure.

8 Claims, 27 Drawing Sheets

SEMITRANSPARENT LIQUID CRYSTAL DISPLAY DEVICE

TECHNICAL FIELD

The present invention relates to a semitransparent liquid crystal display device with high intensity and low power consumption.

BACKGROUND ART

With the widespread use of mobile terminals and other similar equipment, the reflective liquid crystal panel has been drawn attention. This type of panel reflecting outer light for display shows sufficient display performance in bright conditions like outdoors; however, its visibility remarkably decreases in dark conditions.

In order to overcome this problem, a semitransparent liquid crystal panel capable of being used both indoors and outdoors has been developed by applying the technique of the reflective liquid crystal panel. In such a semitransparent liquid crystal panel, when a backlight is employed, each transparent portion in the form of a square is arranged at the center of a pixel in reflective layers which have a projections and depressions structure. In order to simplify manufacturing requirements, the projections and depressions structure is identical in all pixels (Refer to Japanese Laid-open Patent Application No. 10-319422).

However, in the case where such a large transparent portion is provided at the center of each pixel in the reflective layers, as in the above prior art case, the large total area of the transparent portions are irrelevant to reflection; intensity is insufficient when the panel is used as reflective type. As another problem, since the intensity in the reflective type is determined by the area of the transparent portions, providing transparent portions without regard to the projections and depressions structure makes reflectivity during reflection and permeability during permeation incompatible.

If the color filter layer has the same degree of thickness during permeation and during reflection, there is a problem that light has different degrees of absorption between during reflection and during permeation, thereby making color phases differ between during reflection and during permeation. The reason for this is considered that during reflection, light goes through the color filter layer and then returns through it, substantially making the color filter layer twice as thick as it is during permeation. As a result, for example, when a color filter for reflection with high permeability is used by giving reflectivity priority, there is a problem that the color is lightened during permeation Further the pixels having the same projections and depressions structure also have the same capacity within the screen. Therefore, when the screen is larger, there is a problem that a decrease in gate voltage due to the line resistance of the gate and the source makes the punch-through voltage show different values within the screen, thereby causing flicker.

DISCLOSURE OF THE INVENTION

In order to solve the above-described problems, the inventors of the present invention have achieved a semitransparent liquid crystal display device with backlighting comprising semitransparent reflective layers having a projections and depressions structure as follows.

A first aspect of the invention is a semitransparent liquid crystal display device comprising semitransparent layers having a projections and depressions structure including reflective portions and transparent portions, wherein said transparent portions are so formed as to include nearly flat regions of said projections and depressions structure.

The nearly flat regions (regions of extremely small angles of inclination) in the projections and depressions structure do not contribute to an increase in panel reflectivity, and what is worse, deteriorate display performance because they cause specular reflection. Therefore, by so forming transparent portions as to include the nearly flat regions of the projections and depressions structure, the specular reflection can be prevented. In addition, the presence of the transparent portions can improve the permeability of light emitted from the backlight. The specific effects of the transparent portions will be described in the effects for a second aspect of the invention.

A second aspect of the invention is characterized in the first aspect of the invention, wherein the projections and depressions structure in the nearly flat regions has the angle of inclination of not less than 0 degree nor more than 2 degrees.

The reflection performance of the semitransparent layers having the projections and depressions structure is determined by the angle of inclination of the projections and depressions structure in the reflective portions. In order to efficiently gather ambient light in the viewer's direction, it is necessary to arrange the angle of inclination of 2 to 10 degrees degrees in a specific distribution. Asperities having the angle of inclination of less than 2 degrees are likely to cause specular reflection and are not effective in light-gathering. The specular reflection causes degradation reverse, which remarkably lowers visibility. Thus, regions having the angle of inclination less than 2 degrees do not contribute to an increase in the panel reflectivity, and what is worse, may deteriorate the display performance due to the specular reflection. For this reason, in prior art devices, the reflective layers have been so arranged as not to create regions with small angles of inclination. However, the inventors of the present inventions have found that in a semitransparent display with backlighting, devoting the regions with small angles of inclination to transparent portions not only prevents the occurrence of specular reflection but also improves the panel reflectivity.

The specific effects of the present invention will be described as follows in comparison with a prior art device.

FIGS. 1 and 2 respectively show the top view and a cross sectional view of the array substrate of the liquid crystal panel in the prior art semitransparent liquid crystal display device. In the prior art device, the projections and depressions structure 204 is made from a resist in such a manner that as small flat regions as possible are created so as to prevent the reflective layers 202 from having small angles of inclination. However, no manner how the structure 204 is arranged, the peaks of the projective portions must be nearly flat, so that the reflective layers 202 are formed even in the nearly flat regions. On the other hand, since a large transparent portion 205 not provided with the reflective layers 202 is arranged at the center of a pixel so as to realize the semitransparent type, the projections and depressions structure 204 in the transparent portion 205 does not contribute to an increase in the reflectivity at all.

FIG. 3(a) shows an example of light trails on the reflective layers of the prior art semitransparent liquid crystal display panel. Light 210 reflected on an inclined surface in the projections and depressions structure 204 contributes to an increase in intensity, while light 211 regularly reflected near the peak of a projective portion is one cause of degradation reverse. Furthermore, the inclined surfaces of the projective portions in the transparent portions 213 are provided with transparent electrodes 214 only so that transparent light 215 can be generated without regard to the projections and depressions structure 204. Therefore, the inclined surfaces of the projective portions in the transparent portion 213 do not contribute to an increase in the panel reflectivity at all.

In contrast, the semitransparent liquid crystal display device of the present invention devotes the nearly flat regions of the projections and depressions structure in the reflective layers to transparent portions, which prevents a decrease in panel reflectivity and improves intensity during permeation. Thus devoting the regions not contributing to an increase in the panel reflectivity to transparent portions, both the reflectivity and the permeability can be improved.

FIG. 3(b) shows an example of light trails on the reflective layers of a semitransparent liquid crystal display panel of the present invention. Each transparent portion 301 having a transparent electrode 300 is formed near the peak of a projective portion. Light 302 reflected on an inclined surface which contributes to an increase in reflection performance is generated on the entire surface of the pixel, thereby improving the panel reflectivity. Furthermore, devoting the regions near the peaks of the projective portions which would cause degradation reverse in the prior art structure to the transparent portions 301 reduces the occurrence of gradation reverse and also secures the permeability of the backlight. These effects result from the fact that the panel permeability is determined by the total area of the transparent portions 301.

A third aspect of the invention is characterized in the first aspect of the invention, wherein the projections and depressions structure in the nearly flat regions has the angle of inclination of not less than 0 degree nor more than 4 degrees.

When the regions having the angle of inclination not more than 4 degrees are defined as nearly flat regions, the reflectivity decreases near the regular reflection direction, while the reflectivity in the visibility direction away from the regular reflection direction remains the same, thereby further improving the permeability.

A fourth aspect of the invention is characterized in the first aspect of the invention, wherein at least some of the transparent portions do not have transparent electrodes.

When the transparent portions are small in area, even if they do not have transparent electrodes, the electric field response of the liquid crystal on the transparent portions becomes possible in the electric field between the ambient reflective layers and the counter layers. Consequently the same effects as above can be obtained.

A fifth aspect of the invention is characterized in the first aspect of the invention, wherein the transparent portions have transparent electrodes.

As stated above, this is because if the transparent portions have a small area, transparent electrodes are dispensable; however, if they have a large area, it is preferable that they have transparent electrodes.

A sixth aspect of the invention is a semitransparent liquid crystal display device comprising semitransparent layers having a projections and depressions structure including reflective portions and transparent portions, wherein said transparent portions are so formed as to at least partly include projective portions of said projections and depressions structure.

Since the projective portions include nearly flat regions, areas including the nearly flat regions can be devoted to transparent portions so as to obtain the same effects as those of the first aspect of the invention.

A seventh aspect of the invention is characterized in the sixth aspect of the invention, wherein the transparent portions include peaks of the projective portions and are formed symmetric with respect to the peaks.

When the transparent portions are formed in the areas including at least the peaks of the projective portions of the projections and depressions structure, the peaks of the projective portions are the nearly flat regions of the projections and depressions structure, which can prevent a decrease in panel reflectivity and improve intensity during permeation. In other words, the devotion of the areas not contributing to an increase in the panel reflectivity like the peaks in the projective portions to the transparent portions can improve both the reflectivity and the permeability.

A eighth aspect of the invention is characterized in the sixth aspect of the invention, wherein the transparent portions include peaks of the projective portions and are formed asymmetric with respect to the peaks.

A ninth aspect of the invention is characterized in the sixth aspect of the invention, wherein the transparent portions are formed on half surfaces of the projective portions.

When the transparent portions are provided on the half surfaces of the projective portions to be more specific, when the transparent portions are mainly provided on the half surfaces of the projective portions on the viewer's side and the reflective layers are provided on the other half surfaces, even if outer light is reflected by the viewer's body and goes into the panel from the viewer's side, the light is discharged through a transparent portion out to the rear side. As a result, mirroring is decreased and visibility is improved.

A tenth aspect of the invention is characterized in the sixth aspect of the invention, wherein a cross section of the projective portions has an asymmetrical figure comprising a plurality of inclined surfaces, and the transparent portions are formed on steeply-inclined surfaces of the asymmetrical figure.

When the steeply-inclined surfaces are arranged on the viewer's side, light from the backlight goes diagonally from the transparent portions on the projective portions, which improves the intensity during permeation. Since approximately the entire surface becomes the reflective layers when seen from above, there is another effect of improving the reflectivity.

An eleventh aspect of the invention is a semitransparent liquid crystal display device comprising semitransparent layers having a projections and depressions structure including reflective portions and transparent portions, wherein a cross section of the projective portions of the projections and depressions structure is trapezoids, and the transparent portions are so formed as to at least partly include the top surfaces of the trapezoids.

Since the top surfaces of the trapezoids are nearly flat, the transparent portions can be so formed as to partly include the nearly flat top surfaces, thereby obtaining the same effects as above.

A twelfth aspect of the invention is characterized in the eleventh aspect of the invention, wherein the top surfaces of the projective portions are polygonal.

By making the top surfaces of the projective portions polygonal, the bearing angle of the inclined surfaces can be set freely, facilitating the adjustment of the visual angle.

A thirteenth aspect of the invention is a semitransparent liquid crystal display device comprising semitransparent layers having a projections and depressions structure including reflective portions and transparent portions, wherein the transparent portions are so formed as to include at least the bottoms of depressive portions of the projections and depressions structure.

A fourteenth aspect of the invention is characterized in the thirteenth aspect of the invention, wherein the depressive portions of the projections and depressions structure have bottoms, and the bottoms are nearly flat.

If the transparent portions are so formed as to include at least the nearly flat regions of the depressive portions, the nearly flat regions of the depressive portions do not contribute to the panel reflectivity, which makes it possible to improve both the panel reflectivity and the permeability. This will be described more specifically with reference to FIG. 4. FIG. 4 shows the light trails on the reflective layers of another semitransparent liquid crystal panel of the present invention. Regions 401 between projective portions 400 can be made nearly flat and be used as transparent portions so as to improve both reflectivity and permeability.

A fifteenth aspect of the invention is characterized in the thirteenth aspect of the invention, wherein the reflective portions are formed asymmetric with respect to the peaks of the projective portions.

A sixteenth aspect of the invention is characterized in the fifteenth aspect of the invention, wherein the reflective portions are formed on half surfaces of the projective portions.

As shown in FIGS. 5(a) and 5(b), when the reflective portions are provided asymmetric with respect to the peaks of the projective portions, the outer light can be gathered effectively in the viewer's direction by the same principle as stated above. When the reflective portions 410 are provided more in the side opposite to the viewer's side in the projective portions as shown in FIG. 5(a), the outer light coming from the side opposite to the viewer's side can be collectively gathered. On the other hand, when the reflective portions 410 are provided more in the viewer's side as shown in FIG. 5(b), the outer light reflected by the viewer's body or coming from the back of the viewer can be collectively gathered. When the patterns of FIGS. 5(a) and 5(b) are mixed in an appropriate ratio, their respective light-gathering properties can be averaged in accordance with the mixture ratio, thereby adjusting the light-gathering properties more effectively.

A seventeenth aspect of the invention is a semitransparent liquid crystal display device comprising semitransparent layers having a projections and depressions structure including reflective portions and transparent portions, wherein the transparent portions are formed at least in regions including the peaks of the projective portions and in regions including the bottoms of the depressive portions.

In this structure, both the reflectivity and the permeability can be further improved.

A eighteenth aspect of the invention is characterized in the seventeenth aspect of the invention, wherein both the peaks of the projective portions and the regions including the bottoms of the depressive portions are nearly flat.

A nineteenth aspect of the invention is characterized in the eighth aspect of the invention, wherein the transparent portions are formed separately from each other.

A twentieth aspect of the invention is characterized in the eleventh aspect of the invention, wherein the transparent portions are formed separately from each other.

A twenty-first aspect of the invention is characterized in the nineteenth aspect of the invention, wherein the transparent portions are arranged at random.

A twenty-second aspect of the invention is characterized in the twentieth aspect of the invention, wherein the transparent portions are arranged at random.

Thus arranging the transparent portions at random realizes a panel without having diffraction, coloring, or inconsistencies in intensity.

A twenty-third aspect of the invention is characterized in the thirteenth aspect of the invention, wherein the transparent portions are partly connected with each other.

A twenty-fourth aspect of the invention is characterized in the seventeenth aspect of the invention, wherein the transparent portions are partly connected with each other.

A twenty-fifth aspect of the invention is characterized in the thirteenth aspect of the invention, wherein the reflective portions are partly connected with each other.

A twenty-sixth aspect of the invention is characterized in the seventeenth aspect of the invention, wherein the reflective portions are partly connected with each other.

When the reflective portions are made from conductive material, connecting the reflective portions partly with each other facilitates the electric connection in the contact hole.

A twenty-seventh aspect of the invention is characterized in the thirteenth aspect of the invention, wherein a color filter layer is formed on the projections and depressions structure, and the color filter layer has a thickness of d1 on the projective portions and a thickness of d2 on the depressive portions, the thickness d2 being greater than the thickness d1.

A twenty-eighth aspect of the invention is characterized in the seventeenth aspect of the invention, wherein a color filter layer is formed on the projections and depressions structure, and the color filter layer has a thickness of d1 on the projective portions and a thickness of d2 on the depressive portions, the thickness d2 being greater than the thickness d1.

Light entering as outer light and reflected by the reflective layers permeates through the portions of the color filter layer that have a thickness of d1. The outer light permeates through the color filter layer before reaching the reflective layers, and again permeates through the color filter layer after being reflected by the reflective layers in other words, the outer light permeates through the color filter layer of the thickness d1 twice. On the other hand, transparent light emitted from the backlight through the depressive portions permeates through the color filter layer of the thickness d2 only once. Consequently, even if a color filer layer for reflection with high permeability is used, the transparent light from the backlight passes through the portions of the color filter layer that have a larger degree of thickness, so that enough color reproducibility can be obtained in the case of transparent light.

A twenty-ninth aspect of the invention is characterized in the twenty-seventh aspect of the invention, wherein the thickness d2 is approximately two times larger than the thickness d1.

A thirtieth aspect of the invention is characterized in the twenty-eighth aspect of the invention, wherein the thickness d2 is approximately two times larger than the thickness d1.

In the above structure, the transparent light from the backlight and the outer light have an equal distance to pass through the color filter layer, so that the obtained color reproducibility is approximately equal during permeation and during reflection.

A thirty-first aspect of the invention is a semitransparent liquid crystal display device comprising semitransparent layers having a projections and depressions structure, the semitransparent layers partly overlaying a gate line on a substrate, wherein capacitance in an overlaid area of the semitransparent layers with the gate line decreases with increasing distance from a gate writing side of a liquid crystal panel.

A thirty-second aspect of the invention is characterized in the thirty-first aspect of the invention, wherein an average degree of thickness of said overlaid area increases with increasing distance from the gate writing side of said liquid crystal panel.

A thirty-third aspect of the invention is characterized in the thirty-second aspect of the invention, wherein an area ratio of the projective portions to the depressive portions in the overlaid area increases with increasing distance from the gate line side of the liquid crystal panel.

A thirty-fourth aspect of the invention is a semitransparent liquid crystal display device comprising semitransparent layers having a projections and depressions structure, the semitransparent layers partly overlaying a source line on a substrate, wherein capacitance in an overlaid area of the semitransparent layers and the source line decreases with increasing distance from a gate writing side of a liquid crystal panel.

A thirty-fifth aspect of the invention is characterized in the thirty-fourth aspect of the invention, wherein an average degree of thickness of the overlaid area increases with increasing distance from the gate writing side of the liquid crystal panel.

A thirty-sixth aspect of the invention is characterized in the twenty-fifth aspect of the invention, wherein an area ratio of the projective portions to the depressive portions in the overlaid area increases with increasing distance from the gate line side of the liquid crystal panel.

A thirty-seventh aspect of the invention is characterized in the thirty-first aspect of the invention, wherein the capacitance changes continuously.

A thirty-eighth aspect of the invention is characterized in the thirty-fourth aspect of the invention, wherein the capacitance changes continuously.

The effects of the thirty-first to the thirty-eighth aspects of the invention will be described as follows.

During the panel is being operated, the gate voltage decreases due to the line resistance of the gate as it gets far from the writing side. As a result, when the pixels have a uniform capacity within the screen, flicker occurs after writing. The counter potential Vcom necessary to eliminate the flicker differs within the screen. Difference ΔVcom in counter potential at each position within the screen, as compared with the counter potential Vcom on the line side is expressed in Formula (1) below.

$$\Delta Vcom = [(Cst + Cgd + Csd)/Clc] \times \Delta Vg \quad (1)$$

Cst: storage capacity
Cgd: gate-drain capacity
Csd: source-drain capacity
Clc: liquid crystal capacity
ΔVg: difference in gate voltage at each position within the screen, as compared with the initial value of the gate voltage on the line side In order to reduce flicker, it is necessary to maintain ΔVcom below a fixed value, even if ΔVg continuously increases with increasing distance from the writing side. Therefore, it is necessary to reduce all or either one of Cst, Cgd, and Csd in accordance with an increase in ΔVg.

The parasitic capacity due to the projections and depressions structure formed in the overlaid area of the gate line with the reflective layers is included in Cst in terms of an equivalent circuit. Consequently, the parasitic capacity due to the projections and depressions structure formed in the overlaid area of the gate line with the reflective layers with increasing distance from the writing side can be decreased, so as to obtain the effect of reducing flicker. The degree of a decrease in potential due to the resistance of the gate line continuously increases in accordance with the distance from the writing side, provided that the lines have a uniform width. As a result, continuously changing the parasitic capacity can reduce flicker further effectively.

The parasitic capacity can be changed by the average degree of thickness of the projections and depressions structure formed in the overlaid area of the gate line with the reflective layers. The average degree of thickness is defined by the value obtained by dividing the volume of the overlaid area by the bottom space of the overlaid area. Alternatively, the parasitic capacity can be changed by varying the area ratio of the projective portions to the depressive portions. This can be done because the average degree of thickness increases when the projective portions are larger in area than the depressive portions, and decreases when the depressive portions are larger in area.

Generally, when nearly flat reflective layers are used, the space of the overlaid area is changed, and the degree of thickness is fixed so as to continuously change the value of the parasitic capacity for each pixel. This is because it is difficult to change the degree of the thickness of the layers which is determined by how it is deposited from pixel to pixel. However, by using the layers having the projections and depressions structure, the value of the parasitic capacity is easily changed by the ratio of the projective portions to the depressive portions, even if the resist is deposited with a uniform degree of thickness. On the other hand, in a semitransparent panel with the projections and depressions structure, if the parasitic capacity is changed by the space of the overlaid area, regions without the projections and depressions structure are expanded, which decreases intensity and causes its variations within the screen, thereby degrading the display quality. However, by changing the parasitic capacity by varying the ratio of the projective portions to the depressive portions, the projections and depressions structure can be formed on the entire surface, eliminating the occurrence of problems such as an intensity decrease. Consequently, in a semitransparent panel comprising semitransparent layers having the projections and the depressions structure, the occurrence of flicker can be effectively prevented by changing the ratio of the projective portions to the depressive portions that is, average degree of thickness.

The parasitic capacity of the overlaid area of the reflective layers with the source line is included in Csd in Formula (1). Therefore, in the same principle as above, the occurrence of flicker can be reduced by decreasing the parasitic capacity due to the projections and depressions structure formed in the overlaid area of the source line with the reflective layers with increasing distance from the writing side. In this case, too, it is effective to change the parasitic capacity by the average degree of thickness of the projections and depressions structure.

A thirty-ninth aspect of the invention is a semitransparent liquid crystal display device comprising semitransparent layers having a projections and depressions structure including reflective portions and transparent portions, wherein the transparent portions are so formed as to include at least the peaks of projective portions of the projections and depressions structure, and micro lenses are arranged under the projective portions.

In this structure, light from the backlight is gathered by micro lenses and emitted through the transparent portions arranged at the peaks of the projective portions, thereby achieving high intensity during permeation A fortieth aspect of the invention is a semitransparent liquid crystal display device comprising semitransparent layers having a projections and depressions structure including reflective portions and transparent portions, wherein pixels comprise the transparent portions of different area ratios.

In this liquid crystal display device, variations in intensity occur in accordance with the distance from the backlight. The intensity of the panel is likely to increase as it is closer to the backlight. Therefore, intensity within the screen can be uniformed by changing the area ratio of the transparent portions to the pixels according to the position within the screen. To be more specific, the area ratio of the transparent portions can be made smaller as they are closer to the backlight.

A forty-first aspect of the invention is characterized in the fortieth aspect of the invention, wherein the transparent portions have a range of area ratio where panel reflectivity is approximately constant.

When the transparent portions are arranged in the nearly flat regions in the projections and depressions structure, the regions do not contribute to an increase in panel reflectivity, so that the panel reflectivity becomes approximately constant without regard to the area ratio of the transparent portions. Therefore, the intensity within the panel screen can be uniformed both during permeation and during reflection.

A forty-second aspect of the invention is a semitransparent liquid crystal display device comprising semitransparent layers having a projections and depressions structure including reflective portions and transparent portions, wherein the transparent portions are formed in regions where the projections and depressions structure has the angle of inclination of not less than 10 degrees.

A forty-third aspect of the invention is a semitransparent liquid crystal display device comprising semitransparent layers having a projections and depressions structure including reflective portions and transparent portions, wherein the transparent portions are formed in regions where the projections and depressions structure has the angle of inclination of not less than 10 degrees and in regions where the projections and depressions structure has the angle of inclination of not more than 2 degrees.

The distribution of the angles of inclination of the projections and depressions structure has a strong correlation with the reflection properties of the panel. For example, when light enters with the angle of 30 degrees and the reflected light is gathered in the polar angle of 0 to 25 degrees, the angle of inclination involved with light-gathering is in the range of about 2 to 10 degrees. The light reflected in the nearly flat regions of less than 2 degrees becomes light of regular reflection, which causes display defect. On the other hand, the light reflected in regions having a large angle of inclination of not less than 10 degrees is either reflected to the side opposite to the direction of visibility or enclosed inside the panel without being involved with light-gathering. Consequently, as stated above, even if the regions with the angle of inclination of not less than 10 degrees are included in the transparent portions in addition to the nearly flat regions, the reflection properties within the visible range remain the same. Furthermore, the intensity during permeation is improved by the expansion of the area of the transparent portions.

BRIEF DESCRIPTION OF THE DRAWINGS

FIG. 25 shows the structure of a modified example of the semitransparent liquid crystal display device of Embodiment 8.

FIG. 25 shows the structure of a modified example of the semitransparent liquid crystal display device of Embodiment 8.

BEST MODE FOR CARRYING OUT THE INVENTION

The semitransparent liquid crystal display device of the present invention will be described as follows with reference to the drawings.

EMBODIMENT 1

Figure 6:
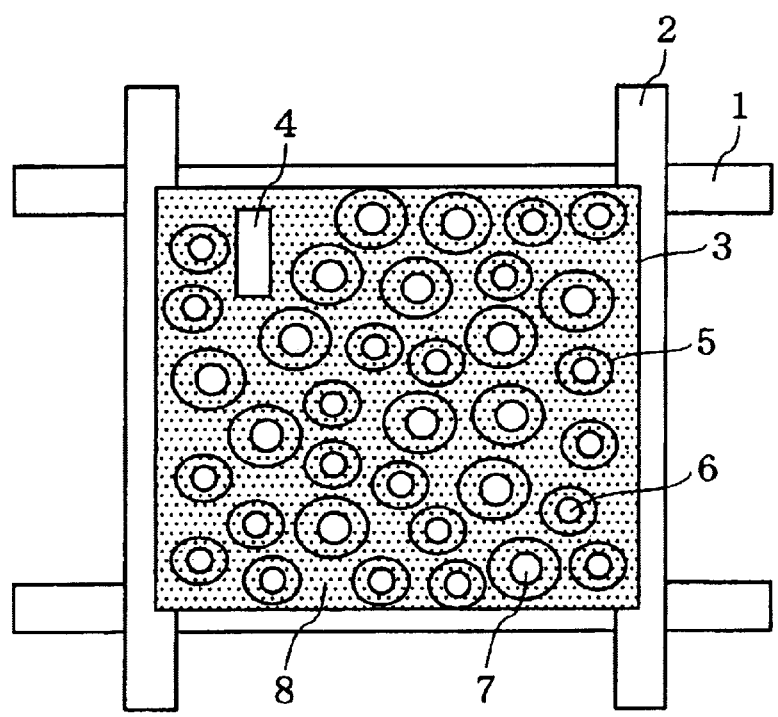
FIG. 6 shows the top view of the array substrate of the semitransparent liquid crystal display device of Embodiment 1.
Figure 7:
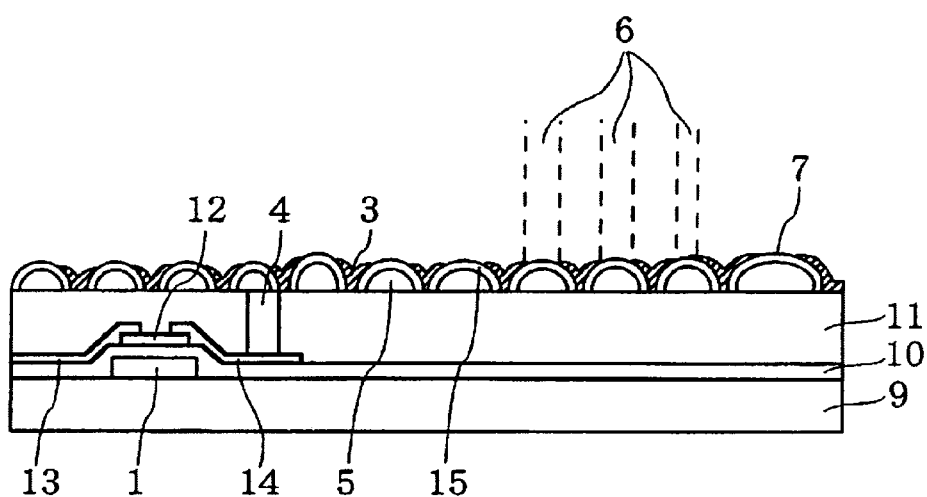
FIG. 7 shows a cross sectional view of the array substrate of the semitransparent liquid crystal display device of Embodiment 1.

FIGS. 6 and 7 respectively show the top view and a cross sectional view of the array substrate of the semitransparent liquid crystal display device of Embodiment 1 of the present invention. In reflective layers (reflective portions) 3 having a projections and depressions structure 5, transparent portions 6 are so formed as to include the peaks (peak portions) 7 of the projective portions.

The peaks 7 of the projective portions are nearly flat and reflect outer light like mirror surfaces, so that they fail to contribute to an increase in reflectivity. If reflective layers were formed on the nearly flat surfaces, the outer light would be undesirably mirrored?, causing gradation reverse. Therefore, devoting the nearly flat regions including the peaks 7 to the transparent portions 6 prevents a semitransparent liquid crystal display device from reducing the reflectivity. This structure also reduces the gradation reverse resulting from the peaks 7 being nearly flat. The transparent liquid crystal display device shown in FIGS. 6 and 7 comprises a gate line 1, a source line 2, reflective layers 3, a contact hole 4, a pixel 8, an array substrate 9, a first insulator layer 10, a second insulator 11, an a-Si layer 12, a first contact layer 13, a second contact layer 14, and transparent electrodes 15.

A method for manufacturing the semitransparent liquid crystal display device will be described as follows.

First, the first insulator layer 10 is formed on the entire surface of the array substrate 9 having the gate line 1 and the source line 2 thereon in such a manner as to cover the gate line 1 by using a silicon oxide. Then, the a-Si layer 12, the first contact layer 13 and the second contact layer 14 are formed on the first insulator layer 10 so as to make a TFT element. After silicon oxide is applied on the entire surface of the substrate 9 so as to make the second insulator layer 11, the projections and depressions structure 5 is formed by applying a photo resist on the entire surface and using a mask exposure. After the contact hole 4 is formed, the transparent electrodes 15 are formed, and aluminum is deposited to form the reflective layers 3. In that case, aluminum is not deposited on the regions including the peaks 7 of the projective portions of the structure 5, thereby forming the transparent portions 6 on the peaks 7. Since the peaks 7 of the projective portions are nearly flat, devoting the regions including the peaks 7 of the projective portions to the transparent portions 6 enables backlight to permeate through the transparent portions 6, making is possible to use the liquid crystal display device as transparent type. Furthermore, the presence of the reflective layers 3 enables the liquid crystal display device to be used as reflective type.

The area of the transparent portions 6 accounts for 30% of the pixel 8. The panel reflectivity was measured by emitting diffused light and found to be 30%.

Figure 1:
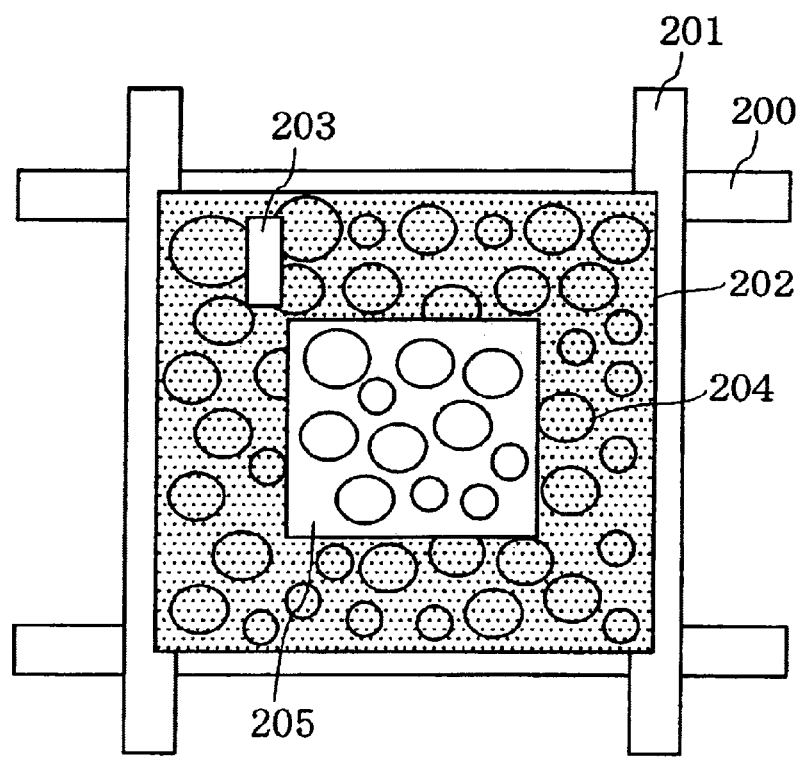
FIG. 1 shows the top view of the array substrate of a prior art semitransparent liquid crystal display device.
Figure 2:
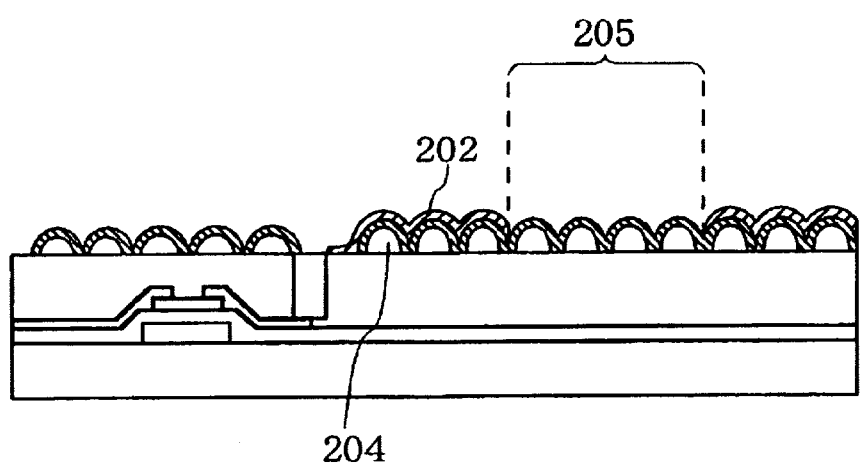
FIG. 2 shows a cross sectional view of the array substrate of the prior art semitransparent liquid crystal display device.
Figure 3A:
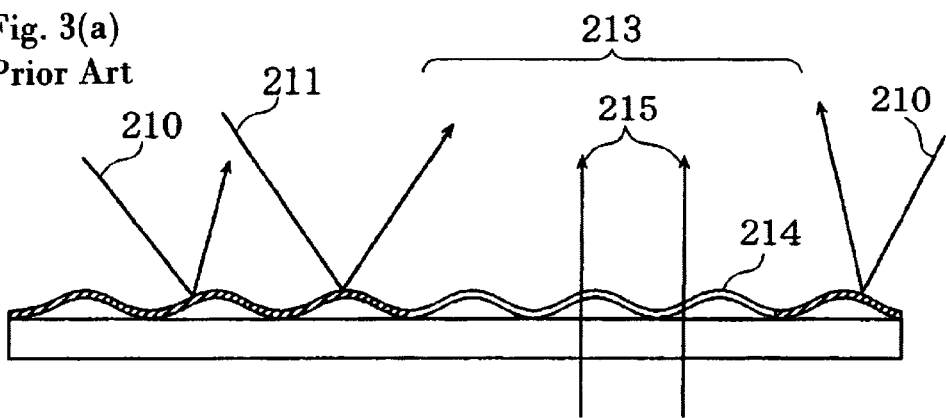
FIG. 3(a) shows the light trails on the reflective layers in the prior art semitransparent liquid crystal display device.
Figure 3B:
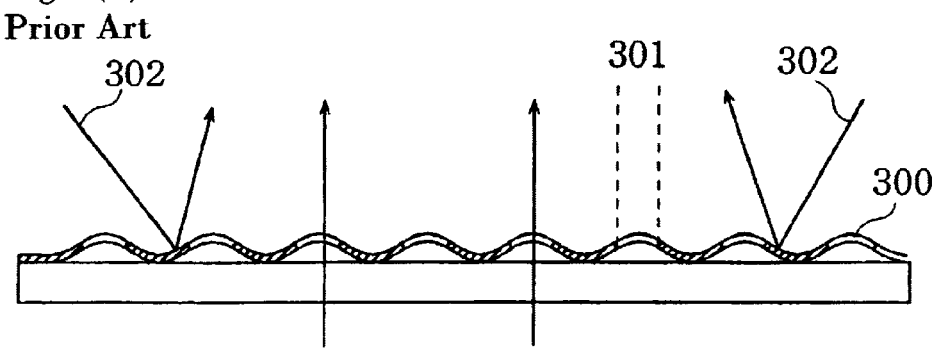
FIG. 3(b) shows the light trails on the reflective layers in a semitransparent liquid crystal display device of the present invention.
Figure 4:
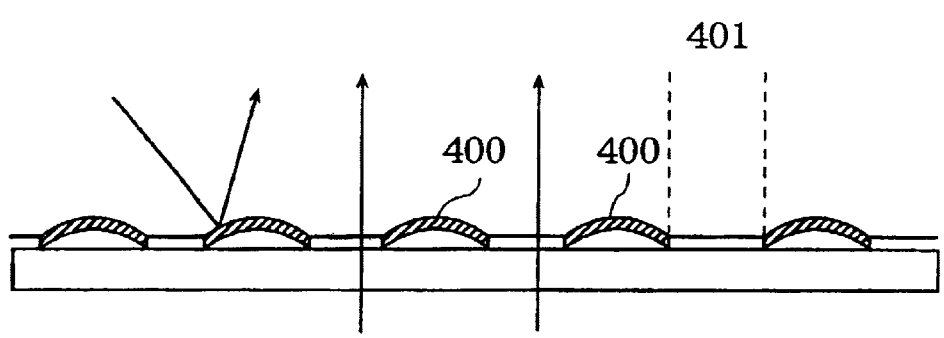
FIG. 4 shows the light trails on the reflective layers in another semitransparent liquid crystal display device of the present invention.
Figure 5A:
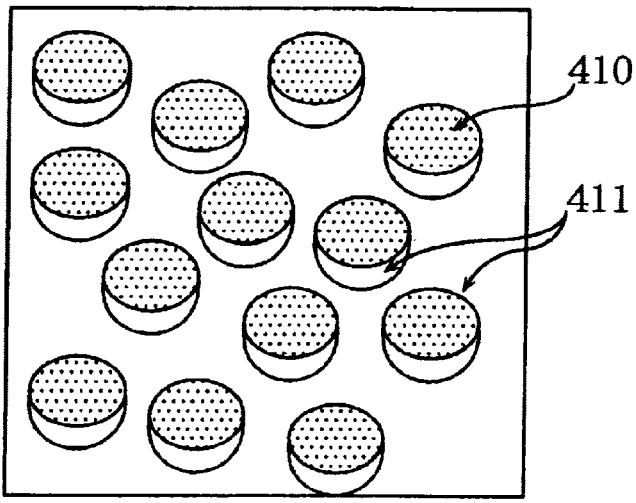
FIG. 5(a) shows the top view of the array substrate where reflective portions are arranged larger on the side opposite to the viewer's side.
Figure 5A:
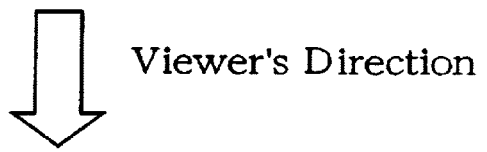
Figure 5B:
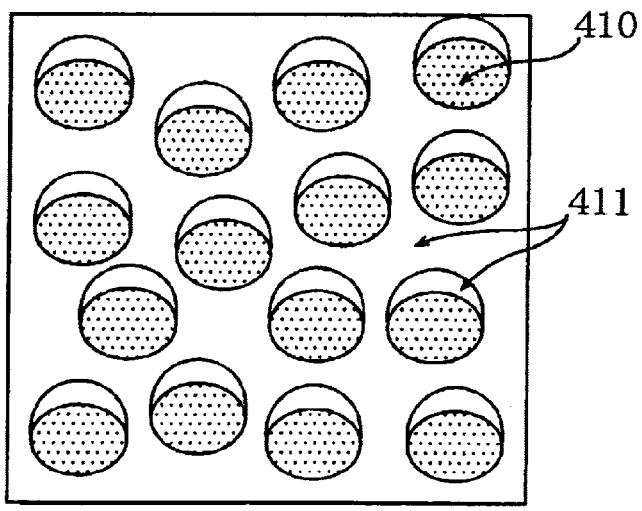
FIG. 5(b) shows the top view of the array substrate where reflective portions are arranged larger on the viewer's side.
Figure 5B:
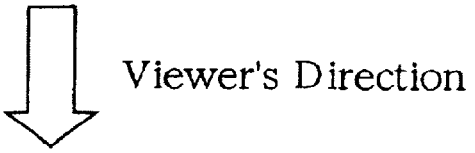
Figure 8:
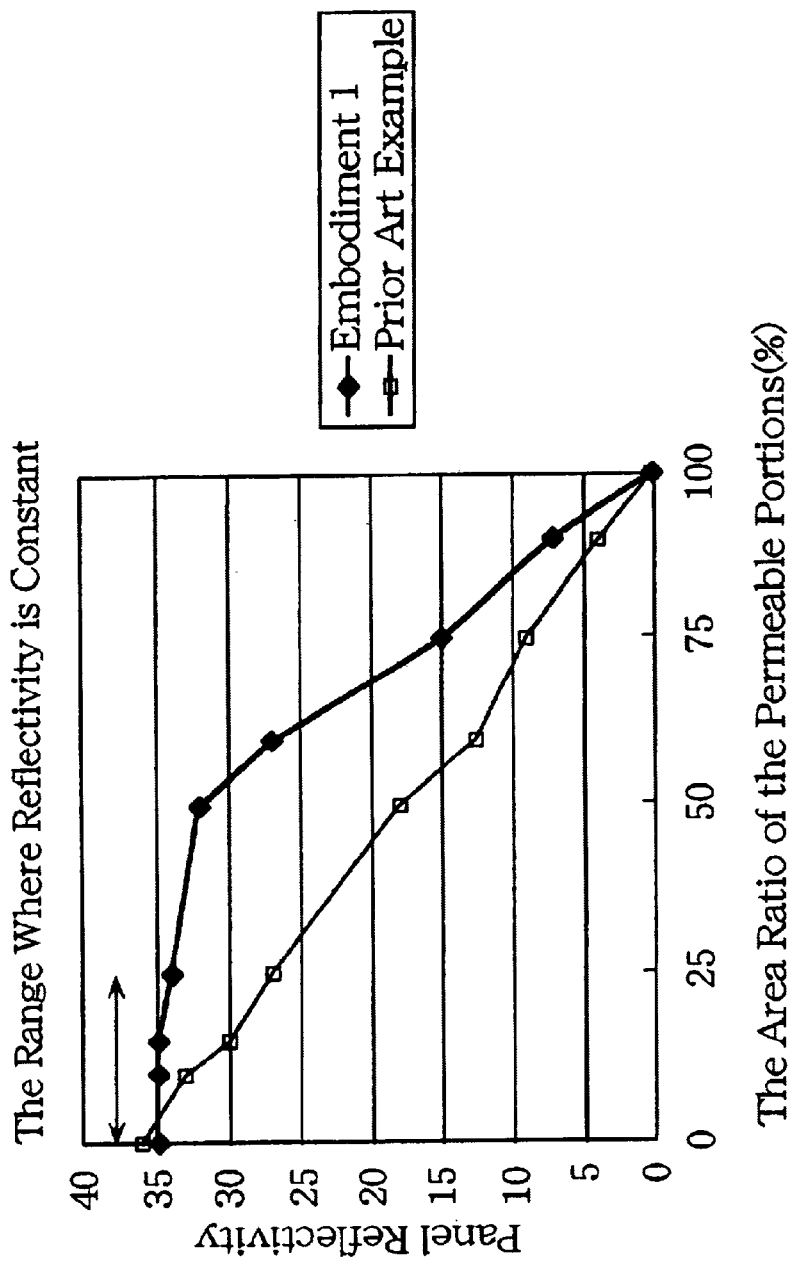
FIG. 8 is a graph showing the relationship between the area ratio of the transparent portions in the array substrate and the panel reflectivity.

The panel reflectivity was measured while changing the area ratio of the transparent portions in the panel from 0 to 100%. The results are shown in FIG. 8. For comparison, FIG. 8 also shows the measurement results of the prior art semitransparent liquid crystal display device shown in FIGS. 1 and 2.

As apparent from FIG. 8, in the prior art device, the panel reflectivity decreases monotonously as the area ratio of the transparent portions in the panel increases. This is because the area ratio of the transparent portions and the panel reflectivity is at a ratio of 1:1 in the prior art device.

In the present embodiment, on the other hand, until the area ratio of the transparent portions in the panel reaches 25%, the panel reflectivity remains approximately the same. When the area ratio further increases, the panel reflectivity decreases, but still is much higher than in the prior art device.

The permeability and the area ratio of the transparent portions in the panel are 1:1, so that in the structure of the present embodiment, both the panel reflectivity and the permeability are higher than in the prior art structure.

Furthermore, as apparent from FIG. 8, in the present embodiment, the area ratio of the transparent portions has a range where the panel reflectivity is approximately constant. The reason for this is that regions in the panel where the angle of inclination of the projective portions is not more than 2 degrees do not contribute to an increase in the panel reflectivity, so that devoting these regions to the transparent portions does not change the panel reflectivity. The reason for the decrease in the panel reflectivity with increasing area ratio of the transparent portions is as follows. As the area ratio of the transparent portions increases, regions with the angle of inclination large enough to contribute to an increase in the panel reflectivity are also included in the transparent portions.

Figure 9:
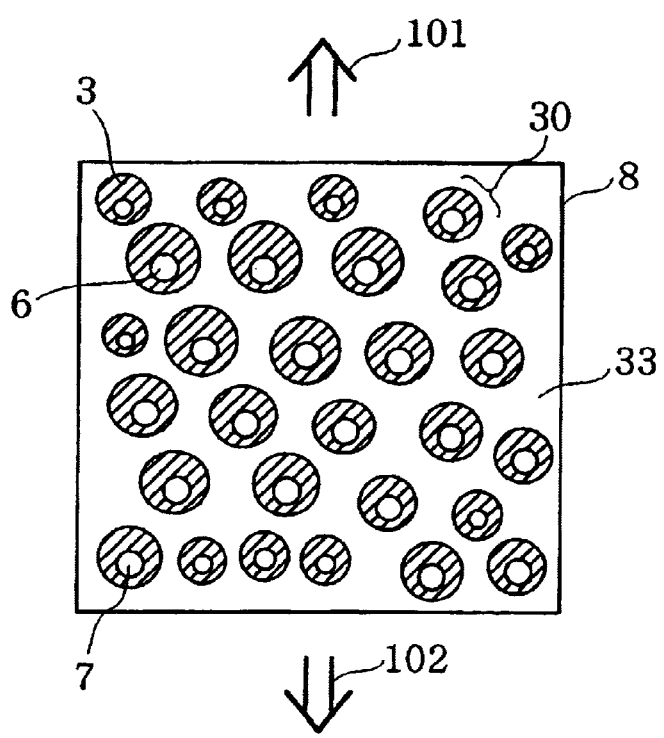
FIG. 9 shows the top view of a modified example of the array substrate of the semitransparent liquid crystal display device of Embodiment 1.

The transparent portions can be formed either symmetric or asymmetric with respect to the peaks 7 of the projective portions. As the transparent portions increase in area, they cover as far as the inclined regions which contribute to the improvement of reflection performance, thereby deteriorating the reflectivity. In that case, as shown in FIG. 9, when the transparent portions 6 are provided in the projective portions 30 in the panel, the reflective layers 3 are arranged more on the side which receives more outer light, while the transparent portions 6 covering the peaks 7 are arranged more on the bottom side of the panel (bottom side in FIG. 9) in consideration of the direction for the panel to be seen. As a result, the permeability is secured without decreasing the reflectivity. Thus, when the transparent portions 6 including the peaks 7 of the projective portions 30 are formed on the outer light side 101 and the viewer's side 102 shown in FIG. 9, it is preferable that the transparent portions 6 are arranged more on the viewer's side 102.

The transparent portions 6 do not have to be provided near the peaks 7 of all the projective portions 30; they can be provided in some of the projective portions 30 in consideration of the degree of degradation reverse. Thus forming the transparent portions 6 in some of the projective portions 30 facilitates the adjustment of the reflectivity.

Figure 10:
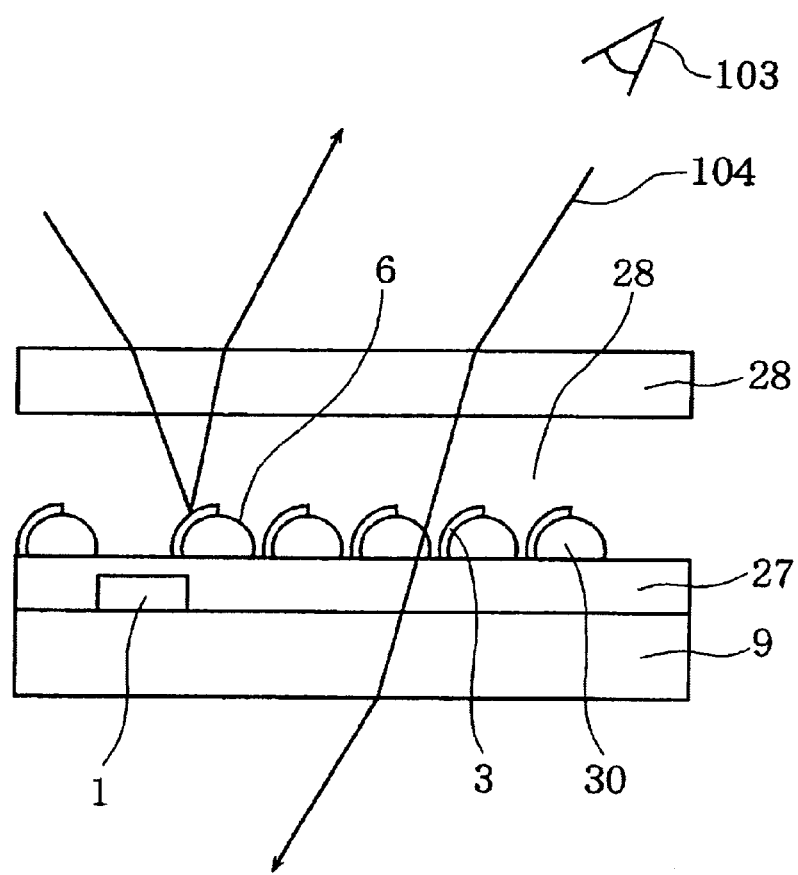
FIG. 10 shows a top view of another modified example of the array substrate of the semitransparent liquid crystal display device of Embodiment 1.

Furthermore, the shape of the transparent portions 6 is not restricted to the one shown in FIG. 9; for example, as shown in FIG. 10, they can be arranged on the half surfaces of the projective portions 30 which are on the viewer's side 103. In that case, even if the outer light 104 is reflected by the viewer 103 and goes into the panel from the viewer's side, it permeates through a transparent portion 6 out to the rear side of the panel. Consequently, there is the effect of decreasing mirroring and improving the visibility.

Figure 11:
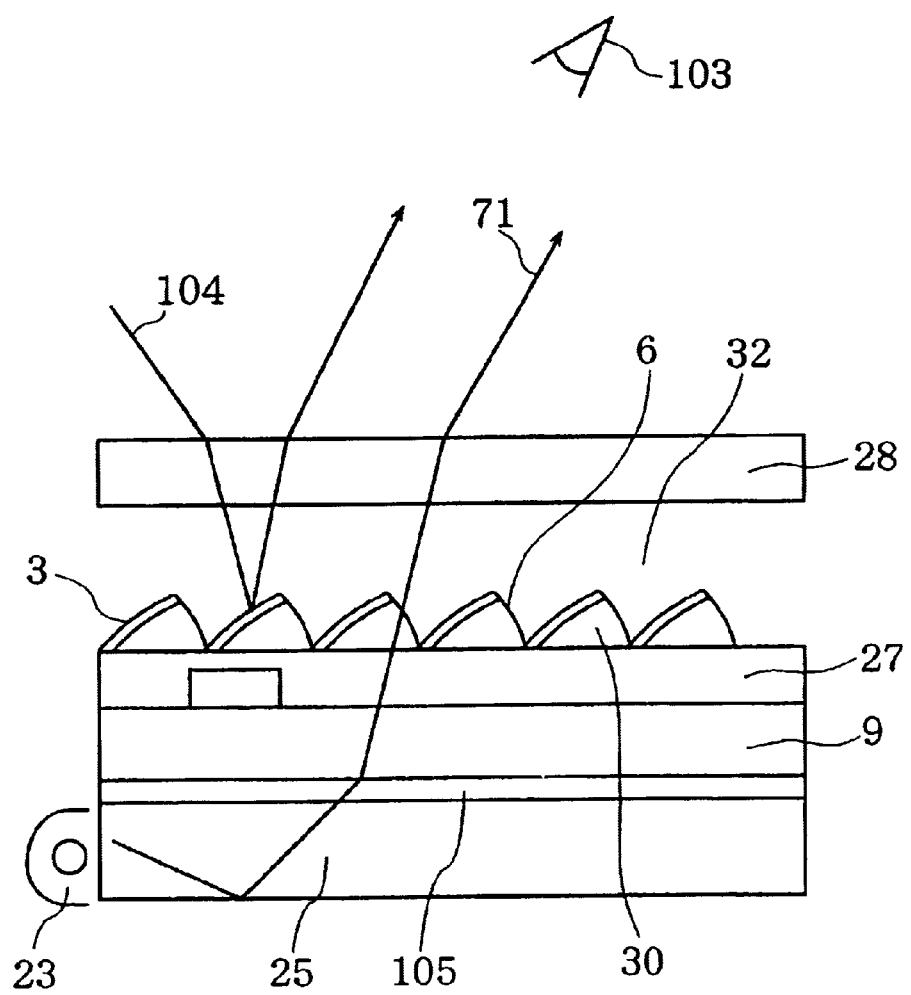
FIG. 11 shows a top view of further another modified example of the array substrate of the semitransparent liquid crystal display device of Embodiment 1.

Furthermore, as shown in FIG. 11, it is possible that the projective portions 30 have asymmetrical cross sections, and that the transparent portions 6 are provided on the steeper surfaces of the projective portions 30 on the side of the viewer 103. In that case, the backlight 71 is gathered by using an optical element 105 and entered diagonally through the transparent portions 6 in the projective portions 30, so as to improve the intensity during the permeation. In addition, when seen from above, nearly the entire surface of the panel is made up of the reflective layers 3, thereby improving the reflectivity.

It is not necessary to form the transparent electrodes 15 under the reflective layers 3; they could be formed over them. It is not necessary, either, to form the transparent electrodes 15 on the entire surface of the panel; they could be formed on a part of the surface. For example, when the transparent electrodes 15 include the transparent portions 6 and partly cover the reflective layers 3 around them, sufficient conductivity can be obtained. Even if the transparent portions 6 do not have the transparent electrodes 15, when the transparent portions are small in area, the electric field response of liquid crystal on the transparent portions 6 can be realized by the electric field formed between the reflective layers 3 and the counter layers, thereby providing the same effects as above. For example, when the panel gap is 10 $\mu$m, no transparent electrode is necessary, provided that the transparent portions 6 have a thickness not more than 8 $\mu$m. The same holds true when the panel gap is around 5 $\mu$m and the transparent portions 6 have a thickness not more than 3 $\mu$m.

Figure 12:
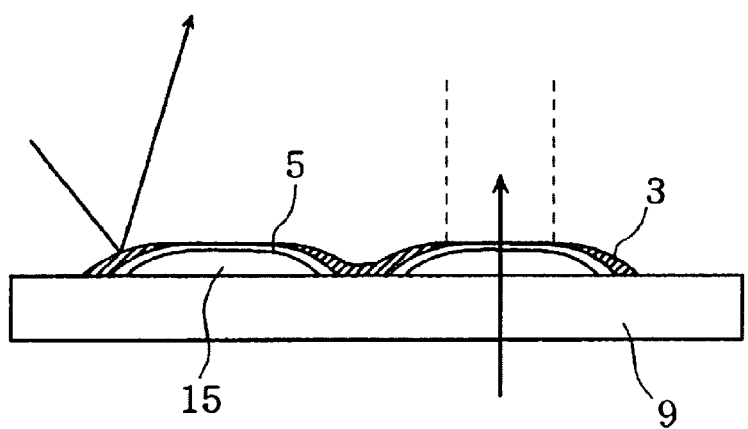
FIG. 12 shows a top view of another modified array substrate of the semitransparent liquid crystal display device of Embodiment 1.

It is not necessary that the projective portions 30 have their peaks 7; they can be trapezoidal as shown in FIG. 12. In that case, the top surfaces of the trapezoids can be devoted to the transparent portions 6 so as to obtain the same effects. The projective portions 30, when seen from above, can be polygonal instead of being circular. By making the projective portions 30 have a polygonal plane figure, the angle of the inclined surfaces can be set freely, thereby providing the effect of adjusting the direction of the vision.

It is also preferable that the ratio of the transparent portions to the reflective layers is varied according to the main use of the liquid crystal display device. If it is mainly used outdoor, the ratio of the reflective layers is preferably not less than 60%. A normal reflective panel has reflectivity of around 35%, so that when the ratio of the reflective layers is not less than 60%, the panel reflectivity becomes not less than 20%, which secures sufficient visibility. On the other hand, in the device often used as transparent type like a notebook personal computer, the ratio of the transparent portions can be set high to obtain good display performance.

In Embodiment 1, the regions having the angle of inclination of not more than 2 degrees are used as the nearly flat regions; however, this is not the only condition possible. In general, in the regions having the angle of inclination close to 0 degree, the panel reflectivity is determined in the direction of visibility close to the regular reflection, while in the regions having the angle of inclination of larger degrees, the panel reflectivity is determined at the angle away from the regular reflection. Therefore, for example, when the angle of inclination not more than 4 degrees is defined as the nearly flat regions, the reflectivity decreases in a position near the direction of the regular reflection, but it remains the same in the visibility direction away from the direction of the regular reflection, thereby realizing a panel with improved permeability.

Embodiment 2

Figure 13:
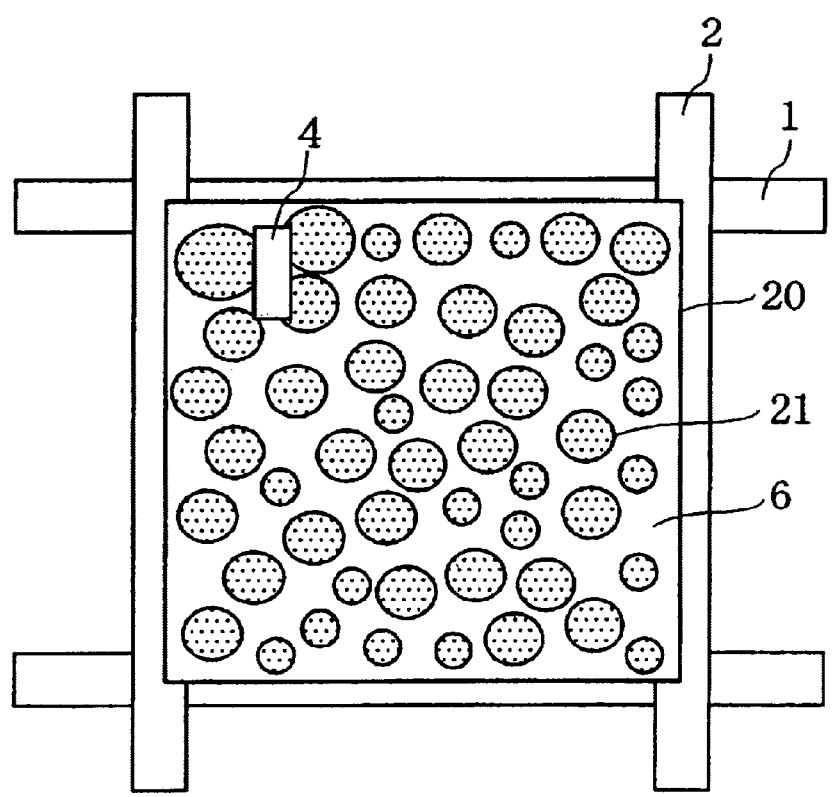
FIG. 13 shows the top view of the array substrate of a semitransparent liquid crystal display device of Embodiment 2.
Figure 14:
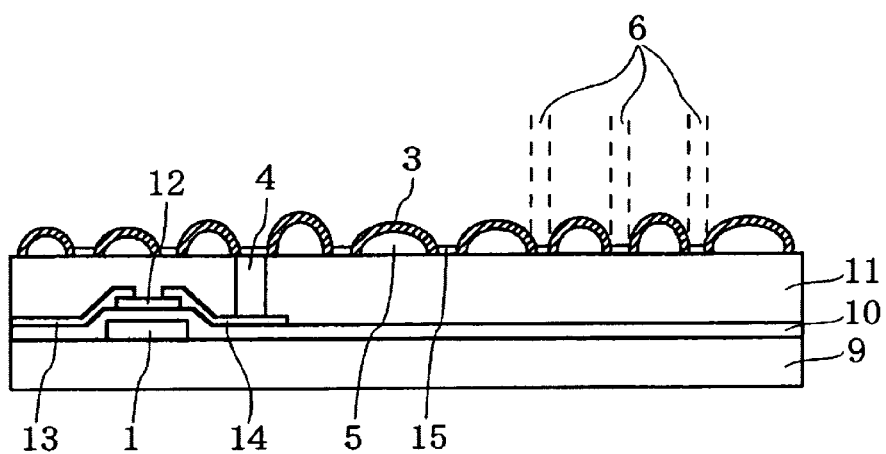
FIG. 14 shows a cross sectional view of the array substrate of the semitransparent liquid crystal display device of Embodiment 2.

FIGS. 13 and 14 respectively show the top view and a cross sectional view of the array substrate of the semitransparent liquid crystal display device of Embodiment 2 of the present invention. These drawings contain a lamp cover 24, a light guide 25, a polarizer 26, an insulator layer 27, a counter substrate 28, a TFT element 29 and a liquid crystal layer 32.

Pixel electrodes 20 have approximately the same structure as those of Embodiment 1 except that they include projective reflective portions 21 and transparent portions 6 which are nearly flat and arranged among the projective reflective portions 21. The display device of Embodiment 2 differs from that of Embodiment 1 in that reflective layers are formed exclusively in the projective portions of the projections and depressions structure 5 as the projective reflective portions 21, that a single resist layer is formed so as to make the depressive portions nearly flat, and that the nearly flat depressive portions are devoted to the transparent portions through which backlight permeates.

In this structure, the projective reflective portions 21 improve the reflectivity, and the presence of the transparent portions 6 with a large area improves the permeability.

Moreover, the single-layered resist can simplify the manufacturing process of the display device. If the projective reflective portions 21 are made from a conductive material such as aluminum, it can be electrically connected with the transparent electrodes 15 in the depressive portions, so as to be used as electrodes.

In that case, if the liquid crystal layers in the depressive portions have a gap twice as large as the liquid crystal layers in the projective portions, these liquid crystal layers have the same retardation during permeation and during reflection. The liquid crystal layers have the same modulation of light during reflection and during permeation, so that the intensity is improved. In designing the liquid crystal layers, those in the depressive portions and those in the projective portions can have a thickness of around 6 $\mu$m and 3 $\mu$m, respectively. In order to obtain high intensity both during reflection and during permeation, the angle of the twist of the liquid crystal in the liquid crystal layers is preferably in the range of 40 to 90 degrees.

The area ratio of the projective portions to the depressive portions can be varied according to the use of the panel; for example, the area ratio of the depressive portions to the pixel 8 can be varied in the range of 20 to 70%.

Figure 15:
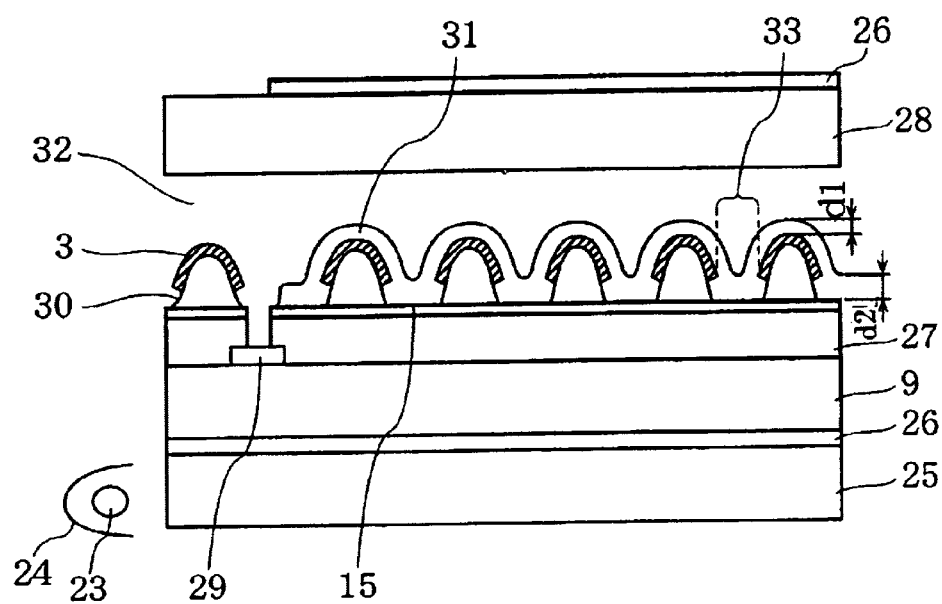
FIG. 15 shows a cross sectional view of a modified example of the Array substrate of the semitransparent liquid crystal display device of Embodiment 2.

FIG. 15 is a cross sectional view of a modified example of the array substrate of the liquid crystal device of Embodiment 2, in which a color filter layer 31 is formed on the array substrate 9. The color filter layer 31 has a thickness of d1 on the projective portions 30 and a thickness of d2 on the depressive portions 33, and the thickness d2 is set to be larger than the thickness d1.

The outer light entered and reflected by the reflective layers 3 permeates through the portions of the color filter layer 31 that have the thickness d1 (the projective portions 30 in the color filter layer 31). The outer light permeates through the color filter layer 31 until it reaches the reflective layers 3, and again permeates through the color filter layer 31 after being reflected by the reflective layers 3 (which means that the outer light twice permeates through the color filter layer 31 of the thickness d1). On the other hand, the transparent light from the backlight 23 passing through the transparent electrodes 15 in the depressive portions 33 only once permeates through the portions of the color filter layer 31 that have the thickness d2 (the depressive portions 33 of the color filter layer 31). Therefore, in the condition of d1<d2, even with the color filter layer 31 for reflection with high permeability, the transparent light emitted from the backlight 23 passes through the portions of the color filter layer 31 that have the larger thickness during permeation, thereby providing sufficient color reproducibility even in the case of transparent light.

In setting the thickness of the color filter layer 31 through which light permeates, if the thickness d2 of the color filter layer 31 on the depressive portions 33 is twice as large as the thickness d1 of the color filter layer 31 on the projective portions 30, the transparent light emitted from the backlight 23 and the outer light have an equal distance to permeate through the color filter layer 31. As a result, approximately the same color reproducibility can be obtained both during permeation and during reflection.

The specific method for fabricating the above semitransparent liquid crystal display device will be described as follows.

First, the transparent electrodes 15 are deposited on the insulator layer 27, and projective portions 30 are so formed as to have a height of 3 μm and a width of 9 μm. The projective portions 30 are surrounded by depressive portions 33 each having a width of 3 to 5 μm. The projective portions 30 have the reflective layers 3 thereon, so that the depressive portions 33 become transparent portions. The area ratio of the transparent portions to the pixel 8 is set at 48%.

Then, a color filter material is applied, and the RGB color filter layer 31 is formed pixel by pixel through a patterning process. The pitch of the depressive portions 33 and the projective portions 30 is only several to 10 μm, so that the color filter material is applied thickly on the depressive portions 33 and thinly on the projective portions 30. To be more specific, the color filter layer 31 has a thickness of 1.9 μm on the depressive portions 33 and a thickness of 1 μm on the projective portions 30.

Using the small-pitched projections and depressions structure 5 enables the color filter material to be so applied as to have different degrees of thickness, thereby making the color filter layer 31 have different degrees of thickness.

Later, the liquid crystal layers in the projective portions 30 are so formed as to have a thickness of 3 μm, thereby realizing a semitransparent liquid crystal display device.

The display performance of the panel was evaluated both during reflection and during permeation. Since the transparent portions were formed in the nearly flat regions, a high reflectivity of 35% was obtained. The area ratio of the transparent portions was as high as 40%. Furthermore, because the color filter layer 31 has different degrees of thickness between the depressive portions and the projective portions, the obtained color reproducibility was approximately equal during reflection and during permeation.

The dimensions of the projective and depressive portions and the degrees of thickness of the color filter layer 31 are not restricted to the above-mentioned figures; the projective portions may have a height of 1 to 5 μm and the color filter layer 31 may have a thickness of 0.5 to 2 μm in the transparent portions and a thickness of 0.25 to 1 μm in the reflective portions.

Figure 16:
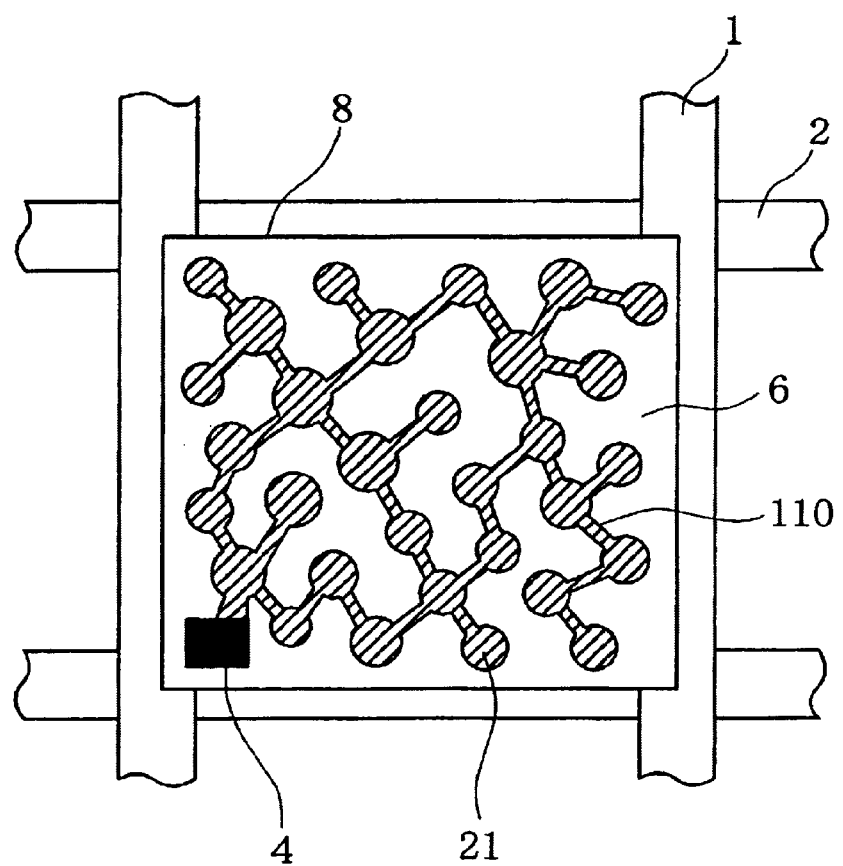
FIG. 16 shows the top view of a modified example of the array substrate of the semitransparent liquid crystal display device of Embodiment 2.

FIG. 16 shows the top view of a modified example of the array substrate in which projective reflective portions 21 are connected with each other via connective portions 110 and also with a contact hole 4, so as to function as reflective electrodes. Thus forming the projective reflective portions 21 connected with each other has the advantage of facilitating the electric connection between the reflective electrodes and the contact hole 4. The connective portions 110 do not necessarily have a similar height to the projective reflective portions 21 and can be thin, provided that they can electrically connect the projective reflective portions 21 each other. If the connective portions 110 are made as high as the projective reflective portions 21, the reflection characteristics can be improved due to the distribution of the angle of inclination of the connective portions 1906 themselves.

Embodiment 3

Figure 17:
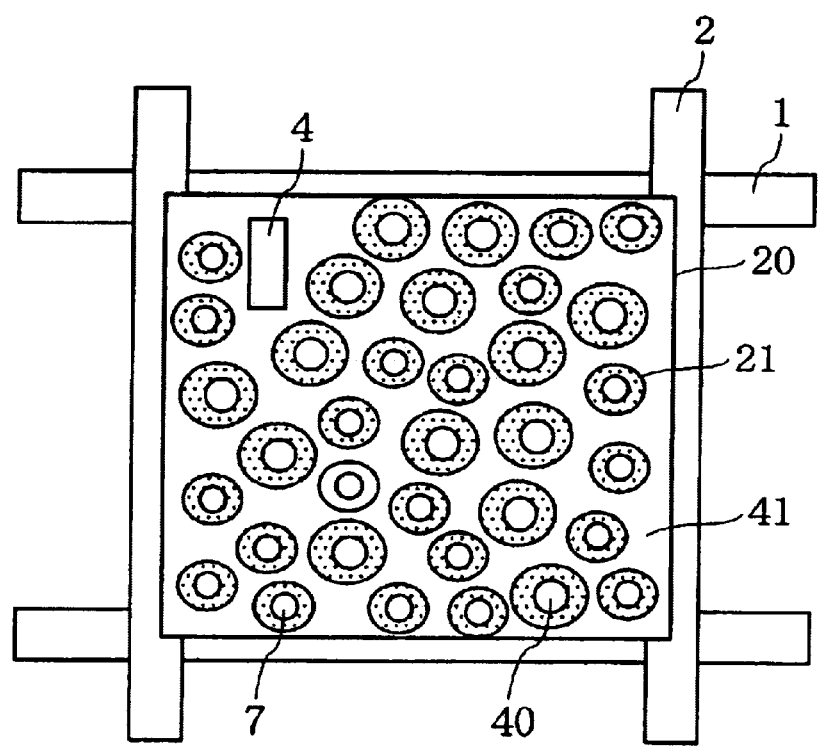
FIG. 17 shows the top view of a modified example of the array substrate of the semitransparent liquid crystal display device of Embodiment 3.

FIG. 17 shows the top view of the array substrate of the semitransparent liquid crystal display device of Embodiment 3 of the present invention. The pixel electrodes 20 have the projective reflective portions 21 thereon having first transparent portions 40. The first transparent portions 40 are so formed as to include the peaks 7 of the projective portions. On the other hand, second transparent portions 41 are formed in the depressive portions 33 of the pixel electrodes 20.

According to this structure, the projective reflective portions 21 improve the reflectivity, and the first and second transparent portions 40 and 41 expand the total area of the transparent portions (the entire nearly flat regions become the transparent portions) to improve the permeability, thereby increasing the intensity when the display device is used as transparent type. The formation of the first transparent portions 40 in such a manner as to include the peaks 7 of the projective reflective portions 21 has the effect of reducing the specular surface reflection due to the presence of the nearly flat regions in the peaks of the projective portions.

Embodiment 4

Figure 18:
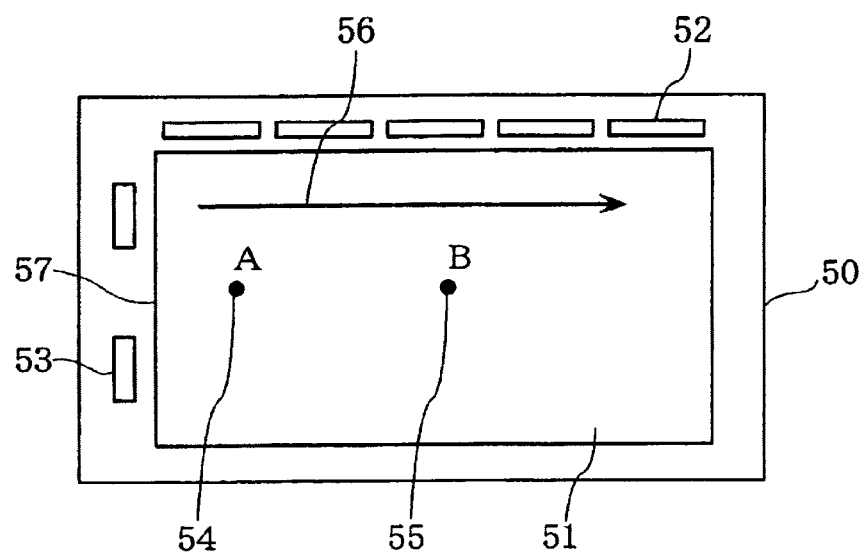
FIG. 18 shows the structure of the semitransparent liquid crystal display device of Embodiment 4.
Figure 19A:
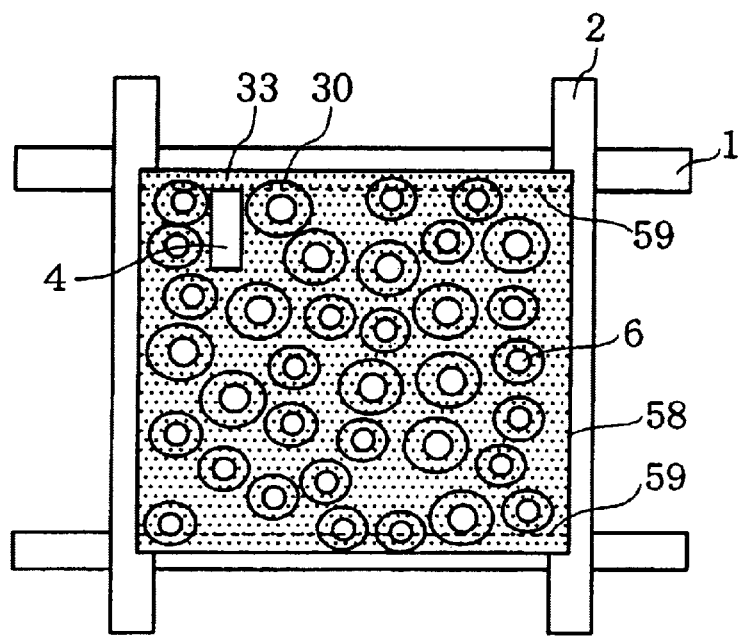
FIGS. 19(a) and 19(b) show top views of the array substrate of the semitransparent liquid crystal display device of Embodiment 4.
Figure 19B:
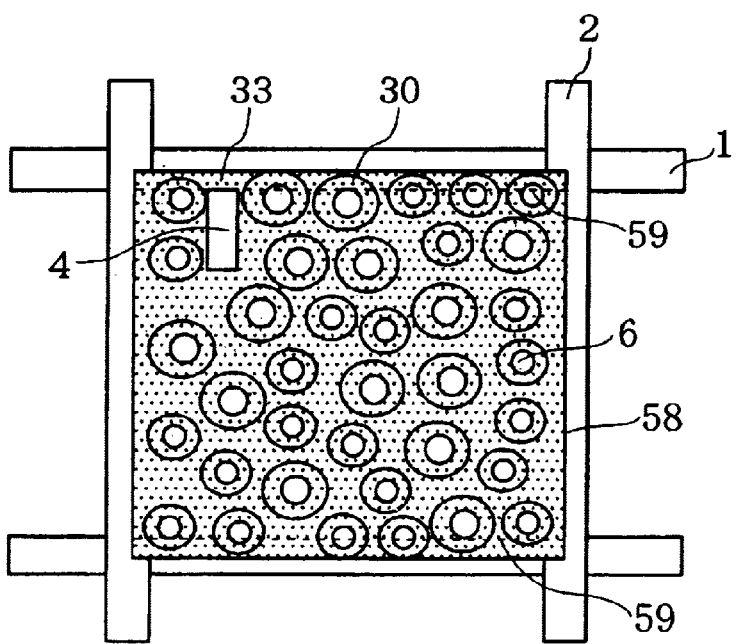

FIG. 18 shows the structure of the semitransparent liquid crystal display device of Embodiment 4 of the present invention, and FIGS. 19(a) and 19(b) show top views of the array substrate of this display device. When pixels A54 and B55 are arranged in the direction 56 of writing the gate potential, the top view of the pixel A54 and the top view of the pixel B55 are shown in FIG. 19(a) and FIG. 19(b), respectively. In an overlaid area 59 of the gate line 1 with the pixel 58, the ratio of the projective portions to the depressive portions in each of the pixels A54 and B55 depends on the writing direction 56; the ratio of the projective portions becomes higher as it gets far from the writing side 57 of the gate. Thus, when the ratio of the projective portions is high, the average degree of thickness increases, thereby decreasing the parasitic capacity. As a result, this structure can reduce the occurrence of flicker. FIGS. 19 contains a liquid crystal panel 50, a display pixel region 51, a source IC 52 and a gate IC 53.

The above-described effects will be detailed as follows.

The gate line 1 has a width of 4 μm, and is overlaid with the pixel 58 by a width of 1.5 μm. The distance between adjacent pixel electrodes is 1 μm. In forming the projections and depressions structure 5, when the resist is applied as thick as 3 μm, the maximum difference between the projective portions and the depressive portions after development is 2 μm. The insulator layer formed beneath the resist has a thickness of 1.5 μm. Consequently, in the overlaid area 59 of the gate line 1 with the pixel 58, the distance between the gate line 1 and the peaks of the projective portions is 4.5 μm, and the distance between the gate line 1 and the bottom of the depressive portions is 2.5 μm.

On the other hand, the area ratio of the projective portions 30 to the depressive portions 33 in the projections and depressions structure 5 at the overlaid area 59 of the gate line 1 with the pixel 58 is continuously changed according to the distance from the writing side 57 of the gate potential. The area ratio of the projective portions 30 is increased as it gets far from the line side 57 in the writing direction 56. To be more specific, the ratio of the projective portions 30 is varied from 20 to 90% within the screen. The area ratio of the projective portions 30 to the depressive portions 33 has a correlation to the average thickness; increasing the ratio of the projective portions 30 has the same effects as increasing the average degree of thickness.

According to the structure of the present embodiment, even if the gate potential decreases due to line resistance, in accordance with the degree of this decrease, the value of the parasitic capacity is optimized within the screen. As a result, flicker is greatly reduced to not more than 100 mV so as to provide excellent display performance.

The gate is supplied with electricity from one side in the present embodiment; it goes without saying that it could be supplied from both sides. When the gate is supplied with electricity from both sides, the same effects as above can be obtained by changing the parasitic capacity according to the writing direction. To be more specific, in the electric supply from both sides, the parasitic capacity is designed to be symmetrical in each line. Since the projections and depressions structure of the overlaid area contributes to the improvement of reflection performance, the electric supply from both sides uniforms the reflection performance in each line, with the effect of achieving uniform display performance.

Figure 25A:
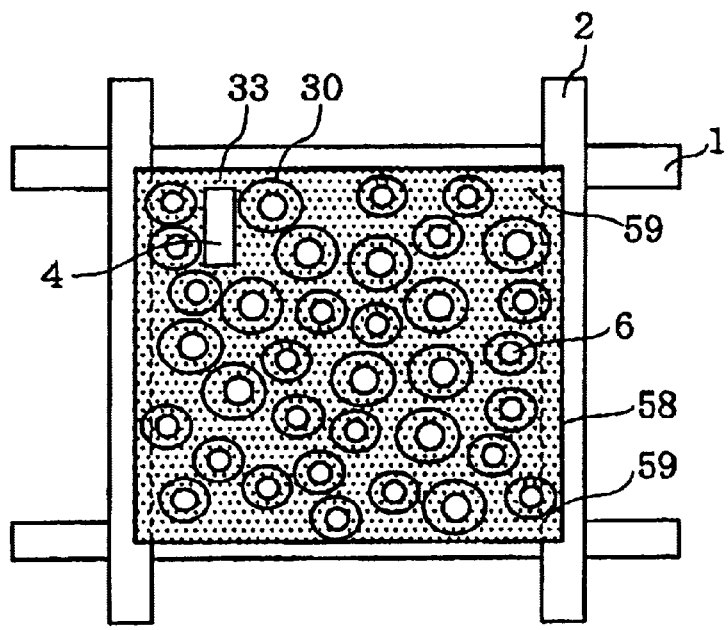
FIGS. 25(a) and 25(b) shows the top view of the array substrate of the semitransparent liquid crystal display device of Embodiment 4.
Figure 25B:
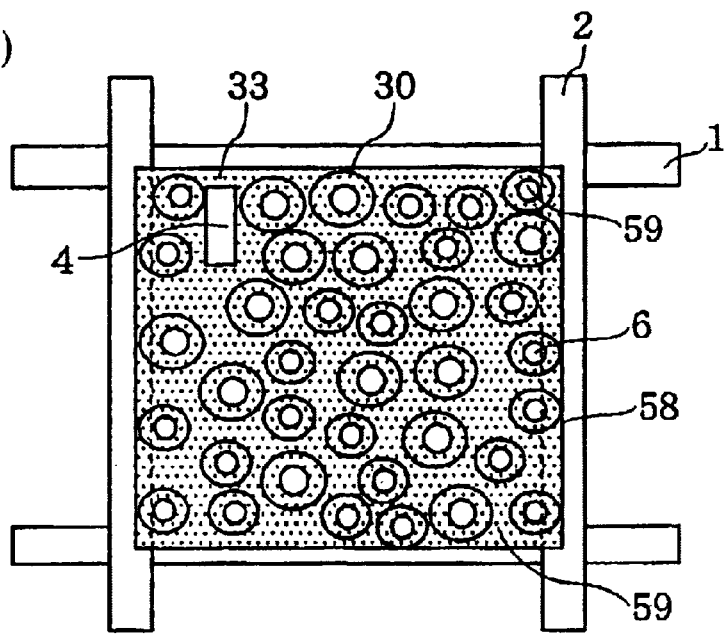

In the present embodiment, the area ratio of the projective portions to the depressive portions in the overlaid area of a pixel with the gate line is varied; instead, the area ratio of the projective portions to the depressive portions in the overlaid area of a pixel with the source line could be changed. The same effects could be obtained by changing the area ratio of the overlaid area of a pixel with the gate line, and the area ratio of the overlaid area of the pixel with the source line, for example, as shown in FIGS. 25(a) and 25(b). Changing the area ratios of these overlaid areas further facilitates the adjustment of the value of the parasitic capacity.

Embodiment 5

In the same structure as Embodiment 4, the average degree of thickness of the overlaid area of a source line 901 with a pixel 906 is varied according to the distance from the writing side.

Embodiment 6

Figure 20:
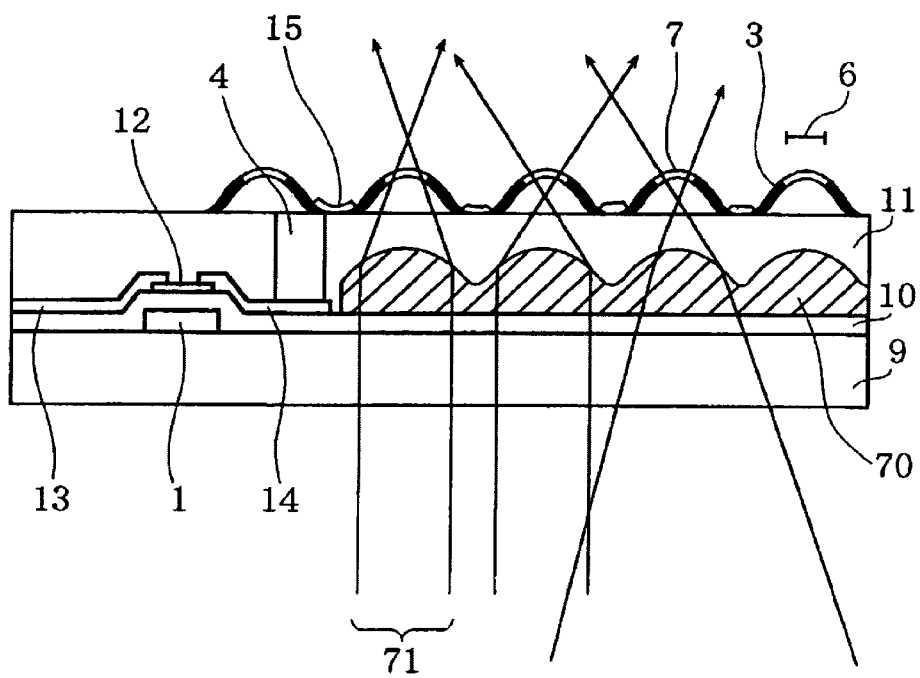
FIG. 20 shows a cross sectional view of the semitransparent liquid crystal display device of Embodiment 6.

FIG. 20 shows a cross sectional view of the semitransparent liquid crystal display device of Embodiment 6 of the present invention. The transparent portions 6 through which light 71 emitted from the backlight (not shown) permeates are so formed as to include the peaks 7 of the projective portions of the projections and depressions structure 5, and micro lenses 70 are provided on the rear side of the device. The light 71 from the backlight is gathered at the transparent portions 6 by the micro lenses 70 and emitted. As a result, the light which would be inherently reflected by the rear surfaces of the reflective layers 3 and not be emitted to the viewer's side can permeate through the transparent portions 6, which achieves high intensity.

The specific method for fabricating the semitransparent liquid crystal display device will be described.

First, the gate line 1, the first insulator layer 10 and other components are formed on the array substrate 9, and then the micro lenses 70 are formed by using an ultraviolet cure resin. After the entire surface is flattened by using the second insulator layer 11, the projections and depressions structure 5 and other components are formed. The peaks 7 of the projective portions 33 are devoted to the transparent portions. By arranging the projective portions 30 on the micro lenses 70, the light 71 from the backlight is gathered by the micro lenses 70 and emitted through the transparent portions 6. The micro lenses 70 have a width of 10 μm and a thickness of 1.5 μm, and the projective portions have a width of 12 μm.

As described above, arranging the micro lenses 70 under the projective portions 30 makes the light 71 from the backlight be gathered by the micro lenses 70 and emitted through the transparent portions 6 (the light 71 is less reflected by the reflective layers 3), so that the intensity improves. Experiments were conducted about intensity characteristics, and it was found that the intensity was increased by 120% with the presence of the micro lenses 70, as compared with the case of the absence of the lenses 70.

The second insulator layer 11 is formed on the micro lenses 70 in the present embodiment; however, it could be formed under the lenses 70. In that case, the projective portions 30 can be formed in accordance with the figure of the micro lenses 70. By using the second insulator layer 11, the transparent portions 6 of the projective portions 30 can be formed in accordance with the focal length of the micro lenses 70, which improves the light-gathering efficiency of the light 71. The focal length of the micro lenses 70 is preferably in the range of 1 to 5 μm, from the view point of reducing an increase in the thickness of the second insulator layer 11.

Embodiment 7

Figure 21:
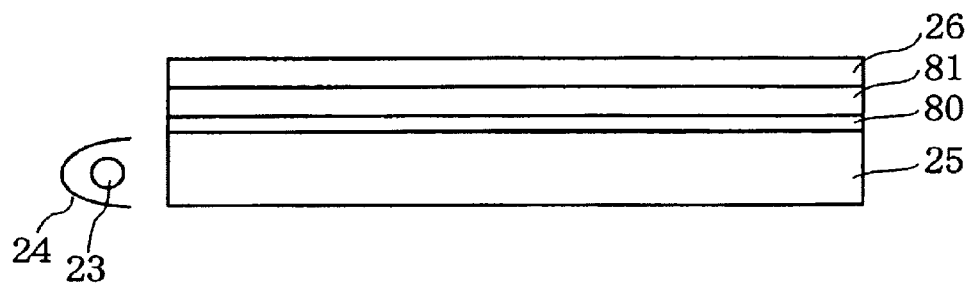
FIG. 21 shows the structure of the semitransparent liquid crystal display device of Embodiment 7.

FIG. 21 shows the structure of the semitransparent liquid crystal display device of Embodiment 7 of the present invention. The backlight 23 is attached to the light guide 25, and a diffusion layer 80 and a semitransparent liquid crystal panel 81 are layered in this order on the light guide 25. By changing the area ratio of the transparent portions 6 to the pixels in the semitransparent liquid crystal panel 81 in accordance with the distance from the backlight 23, the intensity within the screen can be uniformed.

The effects of the semitransparent liquid crystal display device having the above-mentioned structure were verified through the following experiments.

Figure 22:
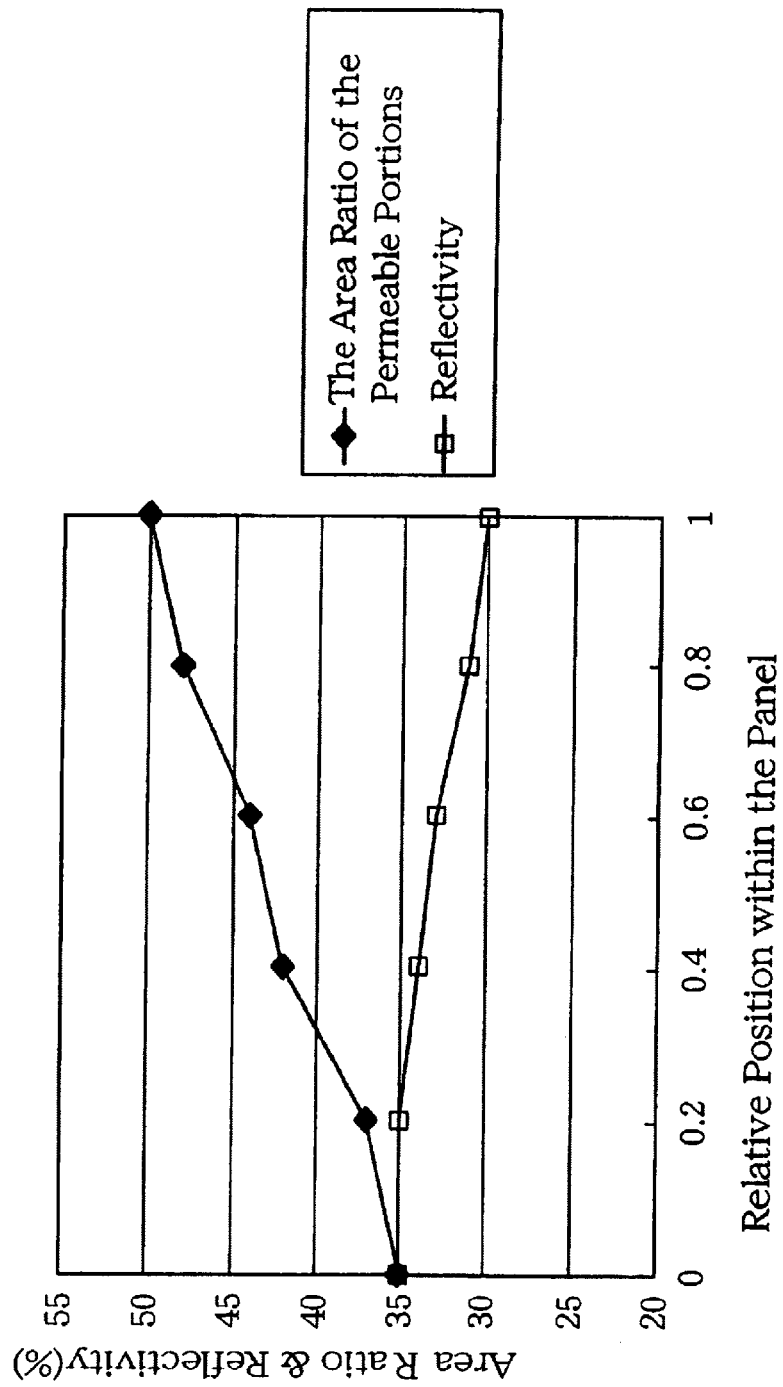
FIG. 22 is a graph showing the relationship among the relative positions within the panel, the area ratio of the transparent portions in the panel, and the panel reflectivity.

The area ratio of the transparent portions to the pixels was changed in accordance with the distance from the backlight 23. The relation among the relative position within the panel, the area ratio of the transparent portions, and the panel reflectivity is shown in FIG. 22. As the relative position within the panel, the backlight side and the opposite side were defined as 0 and 1, respectively. As shown in FIG. 22, when the area ratio was changed from 35% (relative position 0) to 50% (relative position 1) as it got far from the backlight 23, the panel reflectivity reduced from 35% to 30%. However, the degree of the reduction is small enough to consider that the reflectivity within the screen is approximately uniform. Although it is not shown in FIG. 22, the permeation intensity of the light from the backlight 23 was verified to be approximately uniform within the screen.

By adjusting the area ratio of the transparent portions to the pixels in accordance with the intensity distribution of the backlight incident upon the panel, uniform in-screen intensity can be realized both during permeation and during reflection.

As shown in FIG. 8, the provision of the transparent portions on the nearly flat regions in the projections and depressions structure creates regions where the panel reflectivity is not changed even when the area ratio of the transparent portions is varied. Even if the area ratio of the transparent portions is changed from pixel to pixel within the panel, the panel reflectivity can remain approximately the same, provided that the area ratio within the above regions is mainly used, even if the area ratio of the transparent portions is changed within the panel.

Embodiment 8

Figure 23:
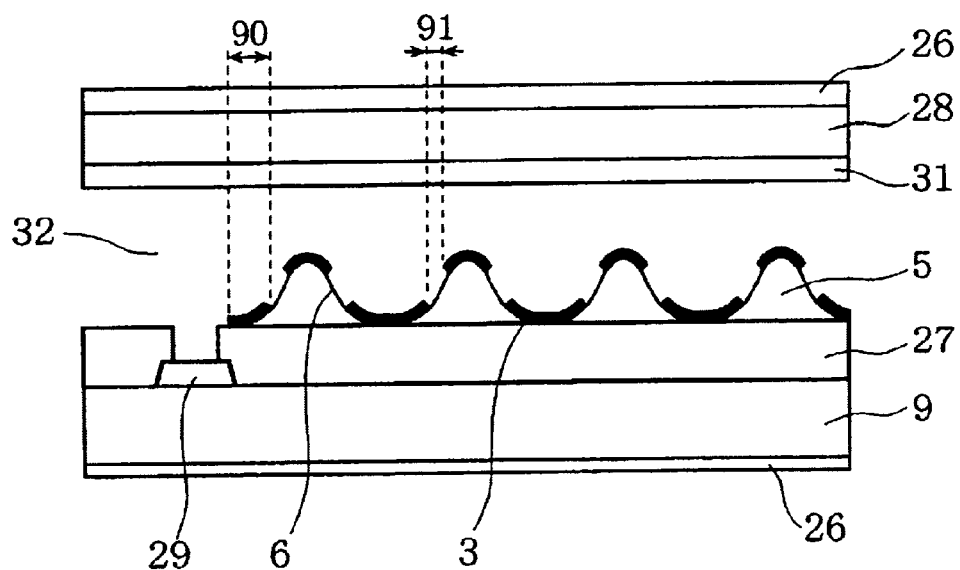
FIG. 23 shows the structure of the semitransparent liquid crystal display device of Embodiment 8.

FIG. 23 shows the structure of the semitransparent liquid crystal display device of Embodiment 8 of the present invention After the projections and depressions structure 5 is formed on the array substrate 9, the reflective layers 3 are formed in the regions of the projections and depressions structure 5 that have the angle of inclination not more than 10 degrees. As a result, the transparent portions 6 correspond to the regions having the angle of inclination not less than 10 degrees. In the structure of the present embodiment, the regions having the angle of inclination not less than 10 degrees and not contributing to the light-gathering in the direction of visibility are devoted to the transparent portions, so that the reflectivity remains the same, thereby improving the intensity during permeation.

These effects were verified by the following experiments.

Figure 24:
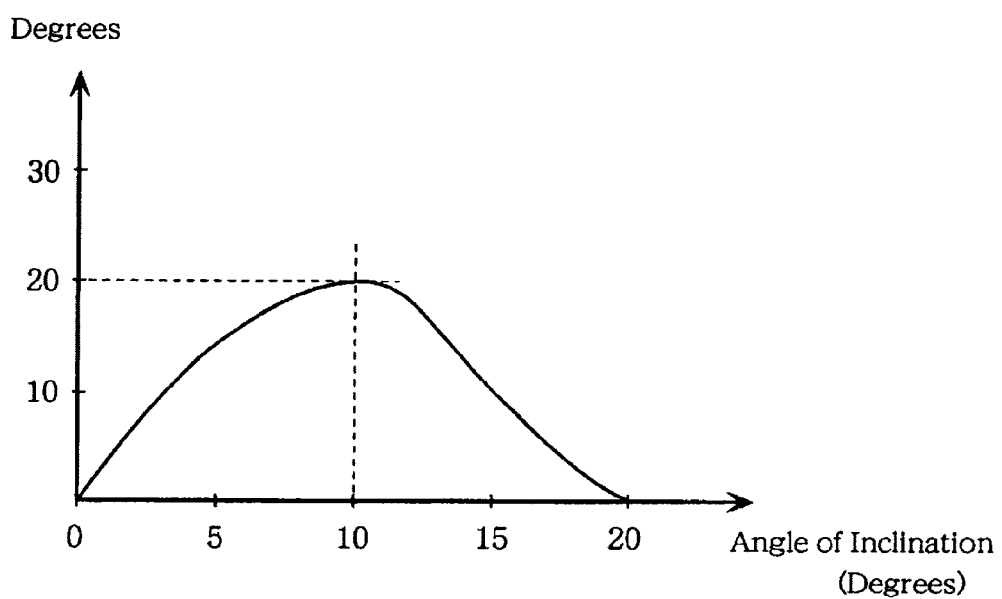
FIG. 24 is a graph showing the distribution of the angles of inclination of the projections and depressions structure 5.

The projections and depressions structure 5 was so formed as to have a width of 10 μm and a height of 3 μm on the array substrate 9. FIG. 24 is the graph showing the distribution of the angles of inclination of the projections and depressions structure 5. The angle of inclination increased monotonously from 0 to 10 degrees, and started to decrease monotonously at 10 degrees. The maximum angle inclination was 20 degrees.

In consideration of the above results, the reflective layers 3 were formed, by using an aluminum alloy, in the regions of the structure 5 that have the angle of inclination not less than 10 degrees. The pixel area ratio of the transparent portions 91 to the reflective portions 90 were 40%:60%. The reflectivity in this structure was examined to find it as high as 30% because the transparent portions 91 in the structure 5 do not contribute to the light-gathering during reflection. On the other hand, high intensity was obtained during permeation because the transparent portions 91 have a pixel area ratio of 40%.

Figure 26:
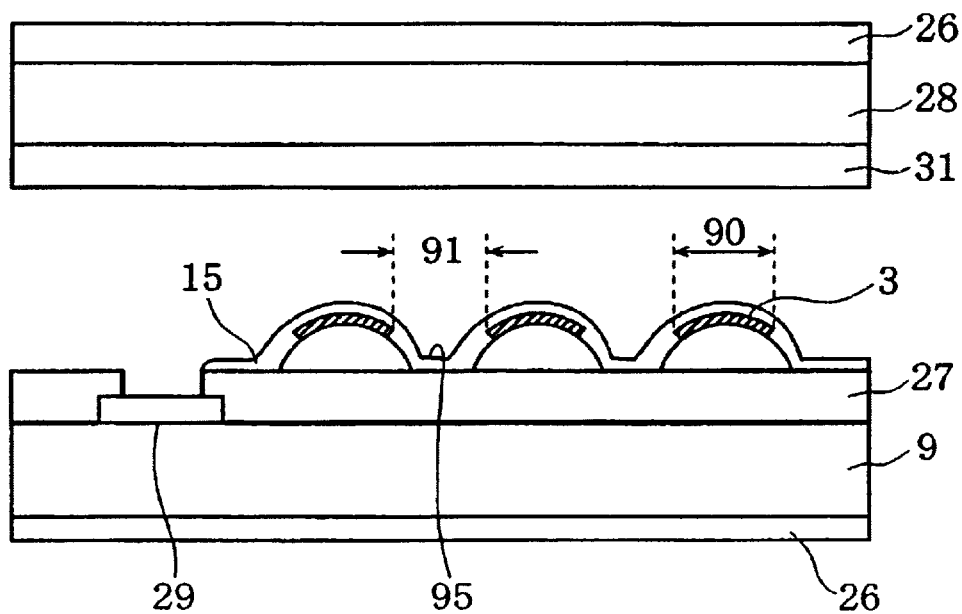
FIG. 26 shows the structure of another modified example of the semitransparent liquid crystal display device of Embodiment 8.
Figure 27:
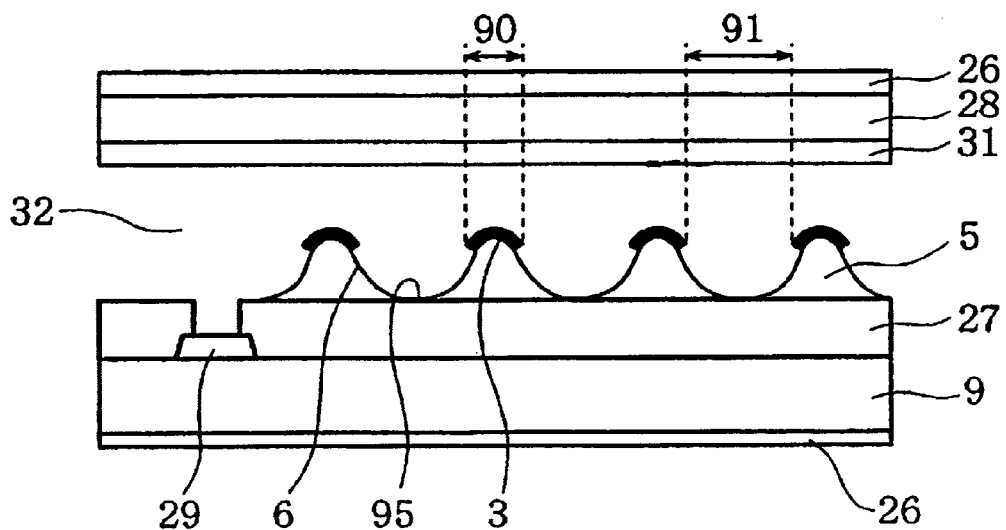
FIG. 27 shows another modified example of the semitransparent liquid crystal display device of Embodiment 8.

In the present embodiment, only the regions having the angle of inclination not less than 10 degrees are devoted to the transparent portions; instead of this, for example, as shown in FIGS. 25 or 26, the nearly flat regions having the angle of inclination not more than 2 degrees, more specifically, bottoms 95 of the projections and depressions structure in FIGS. 25 and 26, could be included in the transparent portions. In this case, the nearly flat regions do not contribute to the light-gathering, which makes it possible to expand the area of the transparent portions without a decrease in reflectivity, so as to achieve higher intensity during permeation.

The transparent portions are not restricted to the regions having the angle of inclination not less than 10 degrees; it could be formed in the regions having the angle of inclination not less than 12 degrees or not less than 15 degrees. When the regions having the angle of inclination not less than 12 degrees and not less than 15 degrees are devoted to the transparent portions, there is the effect of expanding the visible range to −5 and −10 degrees by the polar angle, respectively.

INDUSTRIAL APPLICABILITY

According to the present invention, if relatively flat regions in the reflective layers are made transparent in a semitransparent liquid crystal panel with backlighting, permeability can be improved without decreasing reflectivity.

Furthermore, flicker can be reduced by changing the projections and depressions structure at the overlaid area of a pixel with either the gate line or the source line according to the writing direction of the gate potential.

What is claimed is:

1. A semitransparent liquid crystal display device comprising semitransparent layers having a projections and depressions structure including reflective portions and transparent portions, wherein a color filter layer is formed on said projections and depressions structure, and said color filter layer has a thickness of d1 on said projective portions and a thickness of d2 on said depressive portions, said thickness d2 being greater than said thickness d1.

2. The semitransparent liquid crystal display device of claim 1, wherein said thickness d2 is approximately two times larger than said thickness d1.

3. A semitransparent liquid crystal display device comprising semitransparent layers having a projections and depressions structure, said semitransparent layers partly overlaying a gate line on a substrate, wherein an average degree of thickness of an overlaid area of said semitransparent layers and said gate line increases with increasing distance from a gate writing side of a liquid crystal panel.

4. The semitransparent liquid crystal display device of claim 3, wherein an area ratio of said projective portions to said depressive portions in said overlaid area increases with increasing distance from the gate line side of said liquid crystal panel.

5. A semitransparent liquid crystal display device comprising semitransparent layers having a projections and depressions structure, said semitransparent layers partly overlaying a source line on a substrate, wherein capacitance in an overlaid area of said semitransparent layers and said source line decreases with increasing distance from a gate writing side of a liquid crystal panel.

6. The semitransparent liquid crystal display device of claim 5, wherein an average degree of thickness of said overlaid area increases with increasing distance from the gate writing side of said liquid crystal panel.

7. The semitransparent liquid crystal display device of claim 6, wherein an area ratio of said projective portions to said depressive portions in said overlaid area increases with increasing distance from the gate line side of said liquid crystal panel.

8. The semitransparent liquid crystal display device of claim 5, wherein said capacitance changes continuously.

* * * * *